(12) United States Patent
Murphy

(10) Patent No.: US 12,014,711 B2
(45) Date of Patent: Jun. 18, 2024

(54) ALTERNATIVE METHOD TO REAL-TIME BIDDING SYSTEMS BY OPTIMIZING AGGREGATE SALES THROUGH VIRAL PRICING WITHIN THE DIGITAL ENTERTAINMENT INDUSTRY AND AUDIO FILE PUBLISHING RIGHTS TRACKING THROUGH METADATA EFFICIENCIES

(71) Applicant: Daniel Patrick Murphy, Coronado, CA (US)

(72) Inventor: Daniel Patrick Murphy, Coronado, CA (US)

( * ) Notice: Subject to any disclaimer, the term of this patent is extended or adjusted under 35 U.S.C. 154(b) by 503 days.

(21) Appl. No.: 17/202,140

(22) Filed: Mar. 15, 2021

(65) Prior Publication Data

US 2021/0375247 A1 Dec. 2, 2021

Related U.S. Application Data

(60) Provisional application No. 63/032,445, filed on May 29, 2020.

(51) Int. Cl.
| | |
|---|---|
| *G10H 1/36* | (2006.01) |
| *G06F 16/635* | (2019.01) |
| *G06F 16/638* | (2019.01) |
| *G06F 16/65* | (2019.01) |

(52) U.S. Cl.
CPC ........... *G10H 1/368* (2013.01); *G06F 16/635* (2019.01); *G06F 16/638* (2019.01); *G06F 16/65* (2019.01); *G10H 2210/091* (2013.01)

(58) Field of Classification Search
CPC .............. G10H 1/368; G10H 2210/091; G06F 16/638; G06F 16/65; G06F 16/635

USPC .......................................................... 84/602
See application file for complete search history.

(56) References Cited

U.S. PATENT DOCUMENTS

| | | | | |
|---|---|---|---|---|
| 7,603,626 B2 * | 10/2009 | Williams | ............... | G06Q 10/10 |
| | | | | 715/201 |
| 9,966,107 B1 * | 5/2018 | Kraev | ..................... | G11B 27/00 |
| 10,891,103 B1 * | 1/2021 | Venti | ....................... | G06F 3/165 |
| 11,017,488 B2 * | 5/2021 | Evans | ..................... | G06F 16/44 |
| 11,355,098 B1 * | 6/2022 | Zhong | ..................... | G10L 15/22 |
| 11,481,434 B1 * | 10/2022 | Venti | ....................... | H04L 67/06 |
| 11,514,910 B2 * | 11/2022 | Hashimoto | ............. | G10L 15/30 |

(Continued)

FOREIGN PATENT DOCUMENTS

| | | | | |
|---|---|---|---|---|
| CA | 3029798 A1 * | 1/2018 | .......... | H04N 21/252 |
| GB | 2445279 A * | 7/2008 | .......... | G06F 9/4418 |

OTHER PUBLICATIONS

International Search Report and Written Opinion, dated Aug. 25, 2021, issued for International Patent Application No. PCT/US2021/034012, 7 pages.

*Primary Examiner* — Christina M Schreiber
(74) *Attorney, Agent, or Firm* — Klarquist Sparkman, LLP

(57) ABSTRACT

In some embodiments, a method of combining two or more songs to present one or more campaigns to a plurality of audience members is provided. The method can include combining a first music selection, a second music selection, and one or more videos into a campaign video. The method can further comprise providing the campaign video for playback to the plurality of audience members and receiving a vote from the plurality of audience members, the vote reflecting a preference for the first selection or the second selection.

18 Claims, 40 Drawing Sheets

(56) References Cited

U.S. PATENT DOCUMENTS

| | | | |
|---|---|---|---|
| 2005/0210181 A1* | 9/2005 | Depke | G06F 3/04842 |
| | | | 711/100 |
| 2010/0114783 A1* | 5/2010 | Spolar | G06Q 50/188 |
| | | | 705/26.1 |
| 2014/0046775 A1* | 2/2014 | Harb | G06Q 30/0269 |
| | | | 705/14.66 |
| 2015/0193516 A1* | 7/2015 | Harb | G06Q 30/02 |
| | | | 707/625 |
| 2015/0318020 A1* | 11/2015 | Pribula | H04N 21/2743 |
| | | | 386/290 |
| 2016/0078853 A1* | 3/2016 | Gonczi | A63F 13/42 |
| | | | 700/91 |
| 2018/0192108 A1* | 7/2018 | Lyons | G06F 16/219 |
| 2019/0035372 A1* | 1/2019 | Yoelin | G10H 1/02 |
| 2019/0045252 A1* | 2/2019 | Lyons | H04N 21/47205 |
| 2019/0332627 A1* | 10/2019 | Gouyon | G06F 16/635 |
| 2019/0339823 A1* | 11/2019 | Shaffer | G06F 40/166 |
| 2021/0357447 A1* | 11/2021 | McKenzie | G11B 27/34 |
| 2021/0365526 A1* | 11/2021 | Sachson | G06Q 30/0633 |
| 2021/0375247 A1* | 12/2021 | Murphy | G06F 16/638 |
| 2023/0037657 A1* | 2/2023 | Sachson | G06F 16/2379 |

\* cited by examiner

New Password

Enter your new password, Use at least 6 characters and must include one uppercase letter and at least one symbol (Ej. $ ! ?)

Password

Password (Verification)

Save

FIG. 3

| Home | Dashbord | | | | Create New Campaign |
|---|---|---|---|---|---|
| New Campaign | Active Campaigns | | | | SHOW ALL |
| Campaigns | Campaign Name | Time Left | Reach | Cost | |
| Fund Balance | Campaign 1 | Days/hrs | Display Data | $ | VIEW REPORT |
| Info & FAQ | Campaign 2 | Days/hrs | Display Data | $ | VIEW REPORT |
| My Account | Campaign 3 | Days/hrs | Display Data | $ | VIEW REPORT |
| | Trend Artists/Bands | | | | SHOW MORE |
| | Artist | | Followers | Unlocks | |
| | Artist 1 | | Display Data | Display Data | |
| | Artist 2 | | Display Data | Display Data | |
| Log Out | | | | | |

FIG. 4

| | NEW CAMPAIGN | ① — ② — ③ — ④ — ⑤ — Publish Campaing |
|---|---|---|
| Home | Demographic Reach | |
| | Campaign Name | |
| New Campaign | Campaign Type | |
| Campaigns | Campaign with Battle | Programmatic Campaign |
| Fund Balance | | |
| Info & FAQ | Campaigns with battle allows you to create a battle including the artists and songs with more affinity with your specific audience. You can customize the [Learn More] style and title of your battle. | |
| My Account | Product | |
| | Name | - |
| | Territory | |
| | Country ⌄ | Region ⌄ | Industry ⌄ |
| | | Demographics | |
| | State ⌄ | Age Range ⌄ | Economic Target ⌄ |
| | | Gender ⌄ | |
| | | | Next Step |
| Log Out | | |

Home

New Campaign
Campaign
Fund Balance
Info & FAQ
My Account

NEW CAMPAIGN
Publicity Ads

①—②—③—④—⑤  Publish Campaign

Video AD video.mp4 | Upload Video

Video format must be .mp4 and keeping the weight in 10mb or less.

Brand Banner banner.png | Upload Banner

The Brand Banner shows up when the user votes and before watching the video ad. Image (.png) size must be at 600×400 px and 72 dpi.

Logos logo_white.png | Upload White Logo

Inside our battles we use your white version logo.

logo_color.png | Upload color Logo

Inside the Ad we keep the original colors of your logo.

Both logos (.png) must be 120×80px with transparent background.

Next Step

Log Out

NEW CAMPAIGN
Budget and Cost

① — ② — ③ — ④ — ⑤ — Publish Campaign

Home

New Campaign
Campaign
Fund Balance
Info & FAQ
My Account

Reach -

Choose the metrics you want to get to your goals.

Consumer Reach

Budget

Costs and Expenses Dispersion

Cost
100%
60%
40%
20%
10%

100,000  250,000  500,000  1,000,000  4,000,000

Completed Visualizations

With out expenses dispersion you spend less with more visualizations.

Campaign Budget
$

Cost Per Experience
$

Consumer Reach
Display Data

Learn More

Next Step

Log Out

NEW CAMPAIGN
Publicity Ads

① — ② — ③ — ④ — ⑤ — Publish Campaign

Video AD video.mp4 | Upload Video

Video format must be .mp4 and keeping the weight in 10mb or less.

Brand Banner banner.png | Upload Banner

The Brand Banner shows up when the user votes and before watching the video ad. Image (.png) size must be at 600×400 px and 72 dpi.

Logos logo_white.png | Upload White Logo logo_color.png | Upload color Logo

Inside our battles we use your white version logo.

Inside the Ad we keep the original colors of your logo.

Both logos (.png) must be 120×80px with transparent background.

Next Step

Home
New Campaign
Campaign
Fund Balance
Info & FAQ
My Account

Log Out

NEW CAMPAIGN
Budget and Cost

| Home | | ① — ② — ③ — ④ — ⑤ Publish Campaign |
|---|---|---|
| New Campaign | Reach | Viral Pricing Tiers |
| Campaign | Choose the metrics you want to get to your goals. | Cost |
| Fund Balance | Consumer Reach | |
| Info & FAQ | Budget | |
| My Account | | |

Cost
100%
60%
40%
20%
10%
100,000  250,000  500,000  1,000,000  4,000,000
Completed Visualizations

With out expenses dispersion you spend less with more visualizations.    [Learn More]

Campaign Budget    Consumer Reach
$                  Display Data
Cost Per Experience
$

[Next Step]

Log Out

FIG. 16

Campaigns

Home
New Campaign

Campaigns

Fund Balance
My Account

Filters [ All ] [ Pending ] [ Ended ] [ Active ]   [Create New Campaign]

[🔍 Search]

Recent Campaigns

| Campaign Name | Time Left | Reach | Cost | |
|---|---|---|---|---|
| Campaign 1 | Days/hrs | Display Data | $ | VIEW REPORT |
| Campaign 2 | Days/hrs | Display Data | $ | VIEW REPORT |
| Campaign 3 | Days/hrs | Display Data | $ | VIEW REPORT |

Log Out

ALTERNATIVE METHOD TO REAL-TIME BIDDING SYSTEMS BY OPTIMIZING AGGREGATE SALES THROUGH VIRAL PRICING WITHIN THE DIGITAL ENTERTAINMENT INDUSTRY AND AUDIO FILE PUBLISHING RIGHTS TRACKING THROUGH METADATA EFFICIENCIES

CROSS REFERENCE TO RELATED APPLICATION

This application claims the benefit of U.S. Provisional Application No. 63/032,445, filed May 29, 2020, which is incorporated herein by reference in its entirety.

FIELD

This disclosure relates to systems and methods of optimizing aggregate sales through viral pricing within the digital entertainment industry and audio file publishing rights tracking through meta data efficiencies.

BACKGROUND

The dawn of electronic commerce, coupled with the proliferation of illegal sharing of audio files among computer users in the late 1990's, has dramatically reduced revenue for the music industry, record labels, and artists. This has resulted in a decrease of the sale's life cycle of newly released songs, publishing rights and flattened the sales and publishing rights curve of contemporary and classic music.

To address the lack of digital sales and publishing revenue, the music industry has been relegated to a fractional recoupment of revenue through music streaming distributors, at a fixed price per stream. Brand-related music sponsorship, however, has remained antiquated without a streamlined process, void of any transactional optimization, or real time efficiencies to enable brands to optimize their return on investment or allow record labels and content creators an alternative method to systematically generate revenue through the virality of consumer consumption, in a more technically efficient manner.

SUMMARY

In some embodiments, a method of combining two or more songs to present one or more campaigns to a plurality of audience members is provided. The method can include providing a database including a plurality of available musical selections, receiving from a user a first selection, over a computer network, of a first musical selections from the database, receiving from the user a second selection, over the computer network, of a second musical selections from the database, receiving one or more videos, over the computer network, from the user, and combining the first selection, second selection, and the one or more videos into a campaign video. The method can further comprise providing the campaign video for playback to the plurality of audience members and receiving a vote from the plurality of audience members, the vote reflecting a preference for the first selection or the second selection.

In one embodiment, the playback of the campaign video provides the one or more videos between the first selection and the second selection. In other embodiments, the method can comprise calculating a cost per experience based on a campaign budget and a number of audience members that view the campaign video and/or provide a vote, wherein the cost per experience is reduced when the number of viewing/voting audience members is increased.

In other embodiments, the method can include receiving selected target demographic information from the user and adjusting the providing of the campaign video toward the selected target demographic information, and the demographic information comprises gender information, age information, and/or economic information. In other embodiments, the method can receive selected target geographic information from the user and adjust the providing of the campaign video toward the selected target geographic information. The target geographic information can include a geographic region, country, and/or state.

In some embodiments, the method further comprises providing a plurality of campaign videos for playback to the plurality of audience members, wherein the plurality of campaign videos are provided for playback in a tournament manner, and votes are received from the plurality of audience members to determine a winner of the tournament of campaign videos. The tournament can include a bracket of at least four musical selections. In some embodiments, the tournament comprises a bracket of four, eight, sixteen, thirty-two, or sixty-four musical selections. One of the musical selections can be selected from votes of the audience members as a winner of the tournament.

In some embodiments, the method can include calculating and displaying to the user real-time analytics of the one or more current campaigns. In other embodiments, the method can include receiving a modification to the one or more campaigns from the user, wherein the modification is based on real time analytics to adjust a return on investment by increasing or decreasing a budget based on the flight and frequency of virality of an active one of the one or more campaigns. The method can also include calculating and displaying to the user real-time analytics of the one or more past campaigns.

In another embodiment, a method of combining two or more songs to present one or more campaigns to a plurality of audience members. The method can include providing a database including a plurality of available musical selections, receiving from a first user a first selection, over a computer network, of a first musical selections from the database, receiving from the second user a second selection, over the computer network, of a second musical selections from the database, receiving one or more videos, over the computer network, from the first and/or second users, combining the first selection, second selection, and the one or more videos into a campaign video, providing the campaign video for playback to the plurality of audience members, and receiving a vote from the plurality of audience members, the vote reflecting a preference for the first selection or the second selection. In this manner, at least two users and at least two musical selections can be involved in a battle campaign.

In other embodiments, the database of musical selections comprises multiple catalogs of audio files to be available for intramural distribution within system, with separate servers and firewalls and separate revenue splits. In still other embodiments, the method can include providing the ability for publishing rights organizations to access, monitor, track, and/or modify all music publishing right holders of the musical selections in the database, accurately and in real time.

In other embodiments, the method can include receiving new music publishing right holders and musical selections from the publishing rights organizations, independent artists, and/or providing publishing rights organizations revenue information, with accurate accounting for each publishing right holder and musical selection, accurately and in real time.

In other embodiments, the method can include an Application Programming Interface or (API) directly with digitally based, financial banking Institutions that provide the ability for publishing rights organizations, record labels and independent artists to receive royalty splits and net sales, instantaneously into their Banking institution in real time.

Other embodiments allow auditing firms to access, monitor, track, and/or account for all music publishing right holders of the royalty splits and digital sales generation within the database, accurately and in real time. In other embodiments, the method can include receiving new music publishing right holders, independent artists and musical selections from the publishing rights organizations, and/or providing publishing rights organizations revenue information, with accurate accounting for each publishing right holder and musical selection, accurately and in real time.

The foregoing and other objects, features, and advantages of the invention will become more apparent from the following detailed description, which proceeds with reference to the accompanying figures.

BRIEF DESCRIPTION OF THE DRAWINGS

FIG. 3 illustrates an exemplary password recovery wireframe for an exemplary campaign system.

FIG. 4 illustrates an exemplary dashboard wireframe for a campaign system.

FIG. 5 illustrates an exemplary campaign creation wireframe for a battle campaign system.

FIG. 7 illustrates an exemplary search for songs (musical selections) for a battle campaign system.

FIG. 8 illustrates an exemplary campaign upload wireframe for a battle campaign system.

FIG. 9 illustrates an exemplary campaign preview wireframe for a battle campaign system.

FIG. 10 illustrates an exemplary campaign cost and budget wireframe for a battle campaign system.

FIG. 12 illustrates an exemplary campaign report wireframe for a battle campaign system.

FIG. 13 illustrates an exemplary campaign creation wireframe for a programmatic campaign system.

FIG. 14 illustrates an exemplary campaign upload wireframe for a programmatic campaign system.

FIG. 15 illustrates an exemplary campaign preview wireframe for a programmatic campaign system.

FIG. 16 illustrates an exemplary campaign cost and budget wireframe for a programmatic campaign system.

FIG. 19 illustrates an exemplary user campaign summary and menu wireframe for a campaign system.

Figure 37:
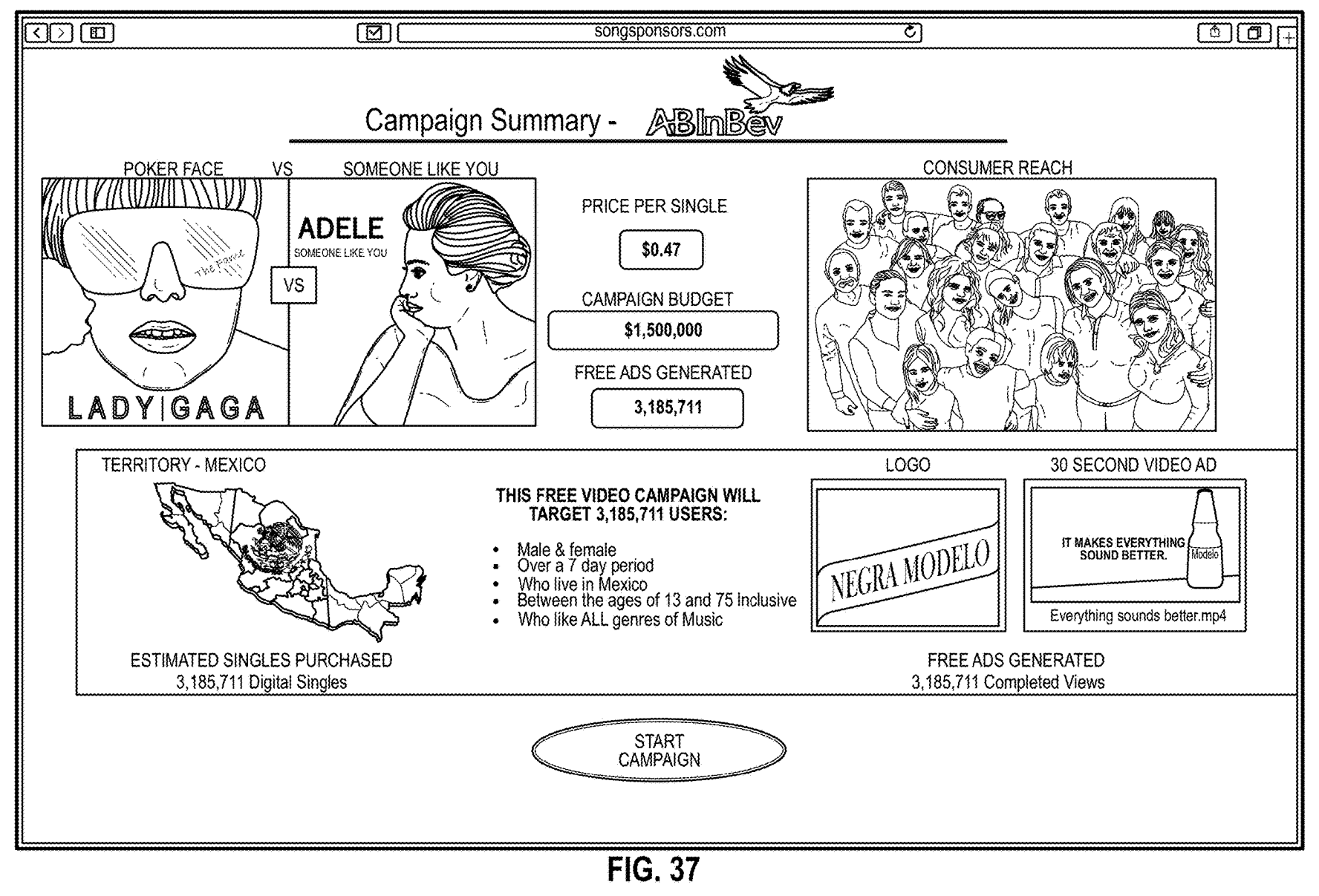

FIG. 37 illustrates an exemplary screenshot of a campaign summary based on the current disclosure.

Figure 42:
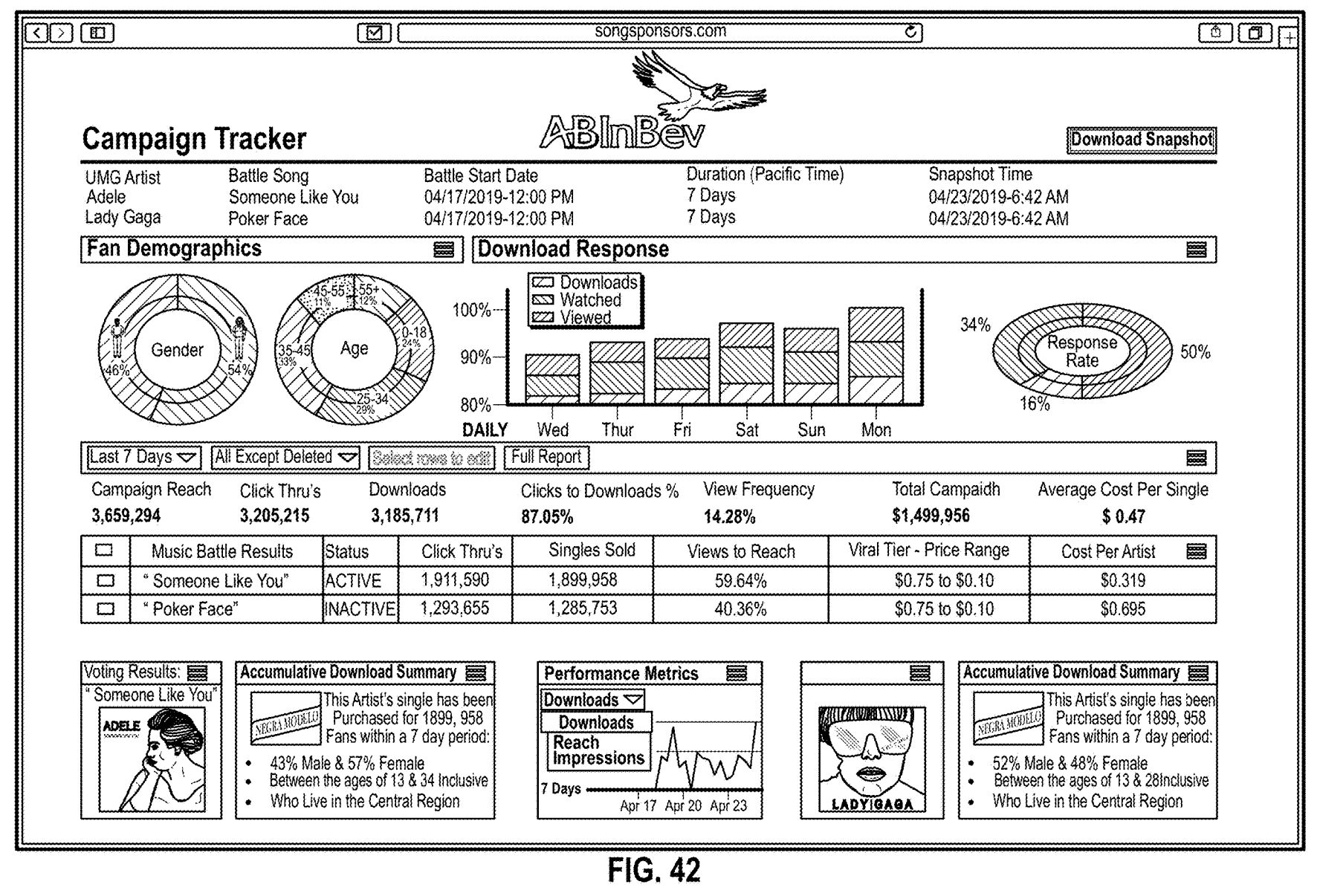

FIG. 42 illustrates another exemplary screenshot of a campaign tracker based on the current disclosure.

DETAILED DESCRIPTION

Figure 1:
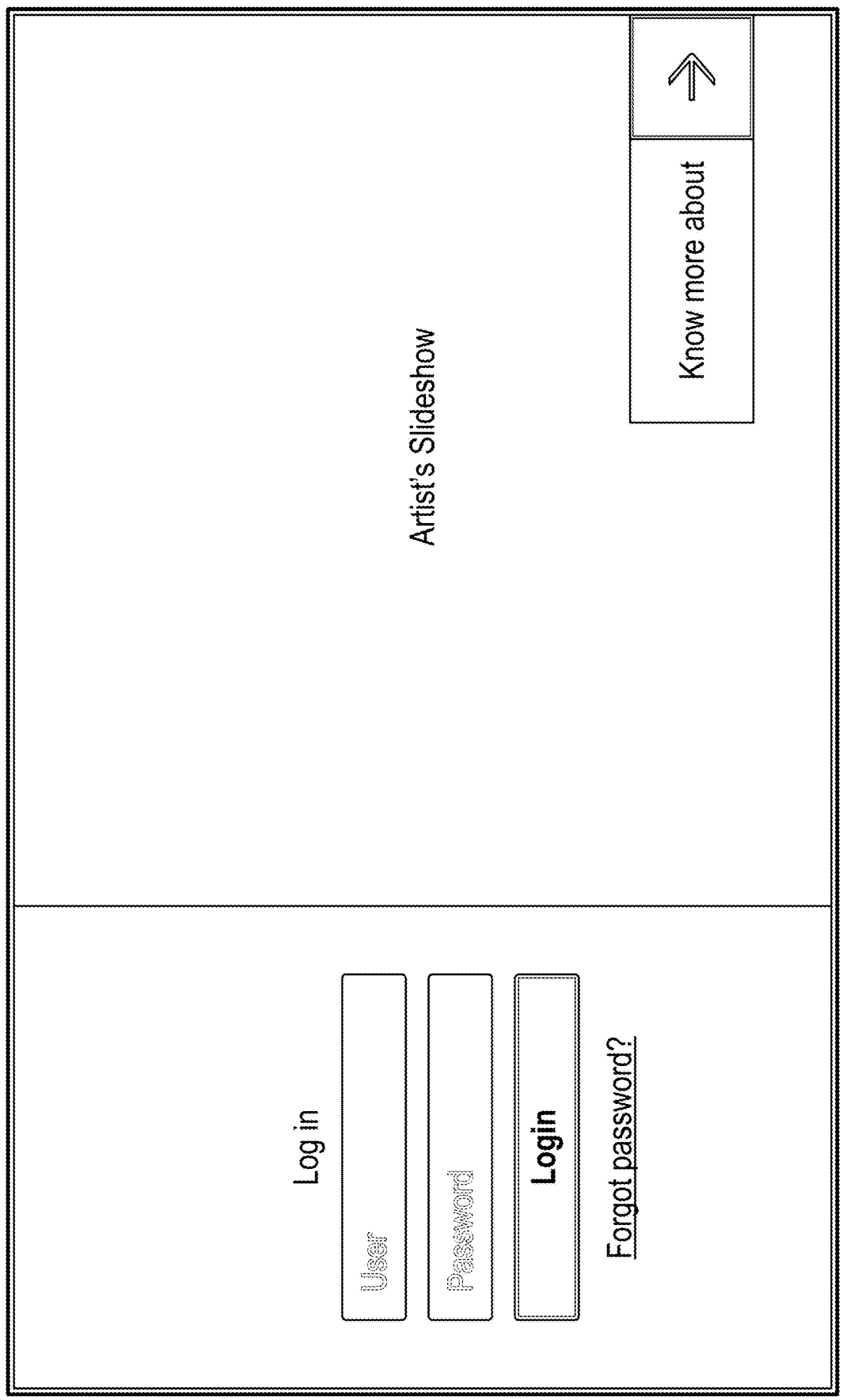
FIG. 1 illustrates an exemplary login wireframe for an exemplary campaign system.

Music publishing and royalty splits among songwriters have also remained antiquated without a streamlined process, void of any transactional optimization, or real time efficiencies to enable publishers to optimize and track publishing rights, royalty splits among either individual composers or a multiplicity of songwriters within an individual song. Additionally, record labels and publishing rights organizations to not have a centralized or digitized system to account and track usage across music distribution channels in a more technically efficient manner.

As a result, music and publishing content is limited to distribution through consumer facing platforms and monetized via programmatic exchanges that rely upon advertisers for revenue. Real-time bidding exchanges leverage the virality of musically related content and charge increasing prices to advertisers, in return for associating advertisers with music content. The following detailed description herein describes technical improvements to conventional systems and methods for publishing and distributing such content.

General Considerations

The present disclosure relates to an alternative innovation relative to real-time bidding systems and methods of using the same. It should be understood that although the various embodiments described herein disclose particular methods or materials applied in specific implementations, in view of these teachings' other methods, materials, and implementations that are similar or equivalent to those described herein may be possible. As such, the following description is exemplary in nature and is not intended to limit the scope, applicability, or configuration of the disclosure in any way. Various changes to the described embodiments may be made, such as in the function and arrangement of the elements described herein, without departing from the scope of the disclosure.

As used in this application the singular forms "a," "an," and "the" include the plural forms unless the context clearly dictates otherwise. Additionally, the term "includes" means "comprises." Furthermore, as used herein, the term "and/or" means any one item or combination of items in the phrase. In addition, the term "exemplary" means serving as a non-limiting example, instance, or illustration. As used herein, the terms "e.g.," and "for example," introduce a list of one or more non-limiting embodiments, examples, instances, and/or illustrations.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "provide," "produce," "determine," and "select" to describe the disclosed methods. These terms are high-level descriptions of the actual operations that are performed. The actual operations that correspond to these terms will vary depending on the particular implementation and are readily discernible by one of ordinary skill in the art having the benefit of this disclosure.

As used herein, the terms "first", "second", and "third" may be used interchangeably to distinguish one component from another and are not intended to signify location or importance of the individual components.

As noted above, the systems and methods described herein, and individual components thereof, should not be construed as being limited to the particular uses or systems described herein in any way. Instead, this disclosure is directed toward all novel and non-obvious features and aspects of the various disclosed embodiments, alone and in various combinations and sub combinations with one another. For example, any features or aspects of the disclosed embodiments can be used in various combinations and subcombinations with one another, as will be recognized by an ordinarily skilled artisan in the relevant field(s) in view of the information disclosed herein. In addition, the disclosed systems, methods, and components thereof are not limited to any specific aspect or feature or combinations thereof, nor do the disclosed things and methods require that any one or more specific advantages be present or problems be solved.

An Alternative Innovation to Real-Time Bidding Systems and Methods

A viral pricing optimization method and distribution process for use in electronic commerce environments involving digital music is described.. As discussed below, these system provide clear technical improvements over conventional systems by providing systems of distribution that relate to the combination of two or more music audio files, tracked in real time with individual flight, frequency and consumer engagement in the aggregate, pre-purchased by advertisers within an infinite, supply side environment to determine optimal pricing for advertisers throughout the commercial. lifecycle of both music audio files and decreasing, tiered pricing that lowers through campaign virality.

The viral apparatus measures real time demand relative to price in order to maximize reach amplification through two methods: by lowering the price as both music audio file's virality increases during a specific timeframe (Duration) while limited to specific geographical regions (Geo Fencing) and user demographics (Analytics) and in the inverse, raising the price of both music audio files to a pre-determined initial price after the timeframe has concluded. Infinite combinations of music audio files allow for infinite potential of virality, creating tremendous sales revenue in the aggregate, while providing advertisers lowering sales tiers thus increasing ROI through virality.

A music publishing optimization method, real-time monetary disbursements, and monitoring process (tracked within the Metadata of each audio file) and available for use in electronic commerce environments involving digital music publishing is also described. Virtual tracking of publishing rights on an individual audio file basis, using a novel combination of the additional metadata embedded into music audio files, monitored in real time with individual royalty splits of each right holder accounted for and embedded with each audio file's metadata to efficiently account for publishing revenue throughout the publishing lifecycle of an audio file in digital commerce.

This innovation to music sponsorship, royalty splits tracking, real-time monetary disbursements and auditable accounting provides a systematic and readily accessible process, scalable to all advertisers and music publishing right holders, without advertisers needing to seek copyright or publishing compliance on an individual basis with record labels, music publishers and content creators, and therefore innovates music sponsorship and Music Publishing into a digital environment in a new and technically efficient manner.

FIGS. 1-19 illustrates exemplary systems and methods for providing the technological advancements disclosed herein.

Figure 2:
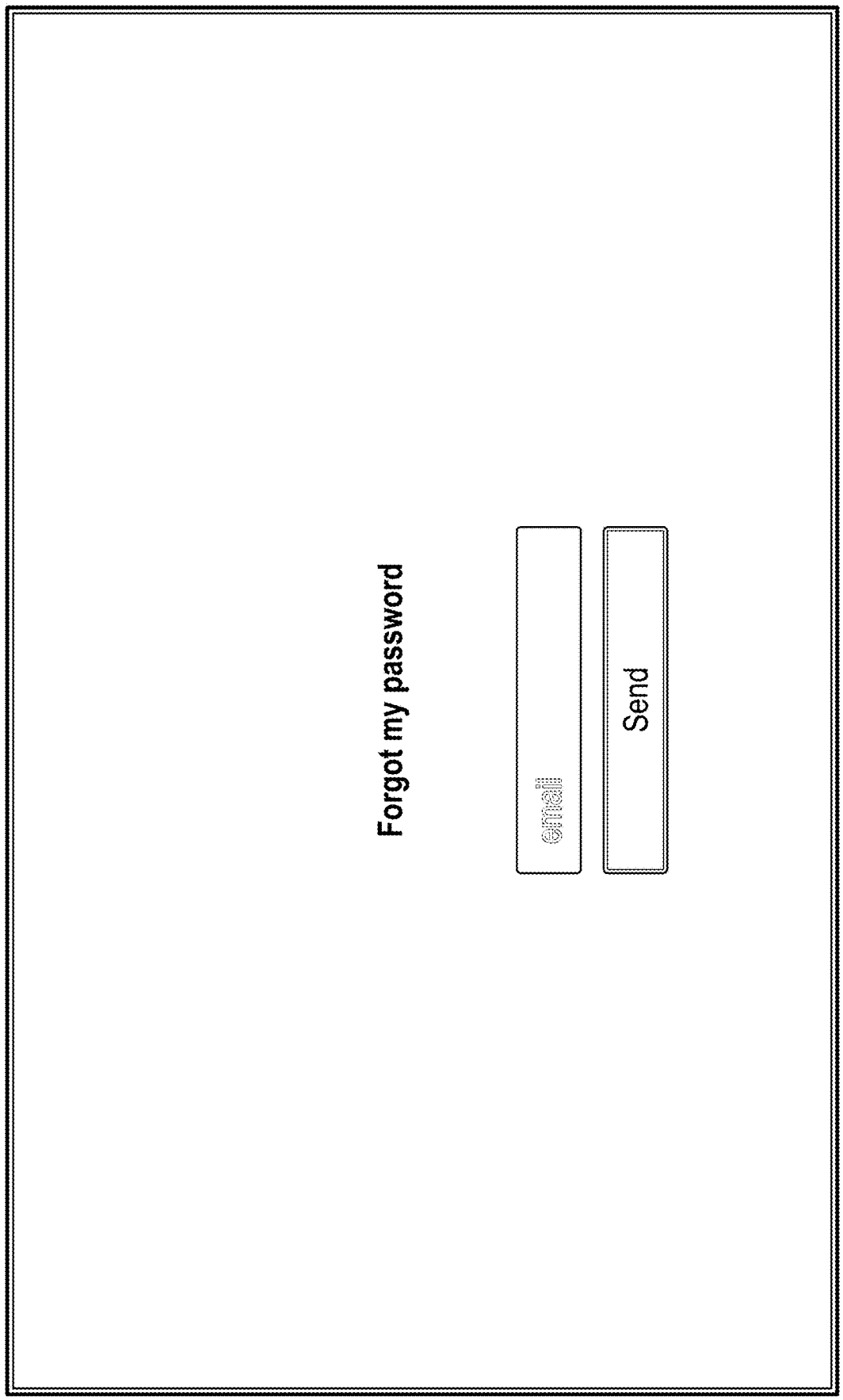
FIG. 2 illustrates an exemplary password recovery wireframe for an exemplary campaign system.

FIGS. 1-3 illustrate an exemplary an exemplary system for providing access to a viral pricing systems disclosed herein. FIG. 1 illustrates an exemplary login screen and FIGS. 2 and 3 illustrate an exemplary password recovery system.

FIG. 4 illustrates an exemplary dashboard for a user. As shown in FIG. 4, the dashboard can provide a visualization of all active campaigns, including the names of such campaigns, time remaining for those campaigns, the reach of such campaigns, and the cost thereof. In addition, the dashboard can provide access to a variety of additional user settings and information, including details about new campaigns, current campaigns, fund balances, additional information and FAQs, and account information. FIG. 4 also provides a listing of artists and/or bands that are currently trending and available for use within a campaign. A limited number of such artists/bands can be illustrated on the dashboard, however, a more complete listing can be found by selecting "show more."

FIG. 5 illustrates an exemplary wireframe for creating a new campaign. FIG. 5 illustrates exemplary options, including naming the campaign and selecting the type of campaign which can be a "campaign with battle" or a "programmatic campaign." In addition, various regional and demographic information about the target market can be selected. For example, a country or state can be selected along with age ranges, genders, and economic targets for the intended viewer.

A campaign with battle, as discussed in more detail below, allows the user to select at least two songs (e.g., by the same or different artists), which can create additional interest with the viewer and therefore, greater engagement with the system and/or brand associated therewith.

Figure 6:
FIG. 6 illustrates an exemplary song (musical selection) selection wireframe for a battle campaign system.

FIG. 6 illustrates an exemplary method and system for selecting two or more songs for a campaign battle. For example, FIG. 6 illustrates the capability of selecting "recommended" battles, which are preselected by the system based on a desired parameter (e.g., popularity among desired geographic/demographics targets), or selecting songs by searching for the song and/or artist in a provided database of available content.

In addition, the battle campaign can include some or all of a selected song. If the battle campaign is to include only a portion of the song, the user can select a start and/or end time of the song for the campaign.

The battle campaign can also be graphically and/or visually customized, such as by selecting one or more background colors, text colors, and/or background images that can be presented during the battle campaign.

Figure 7:
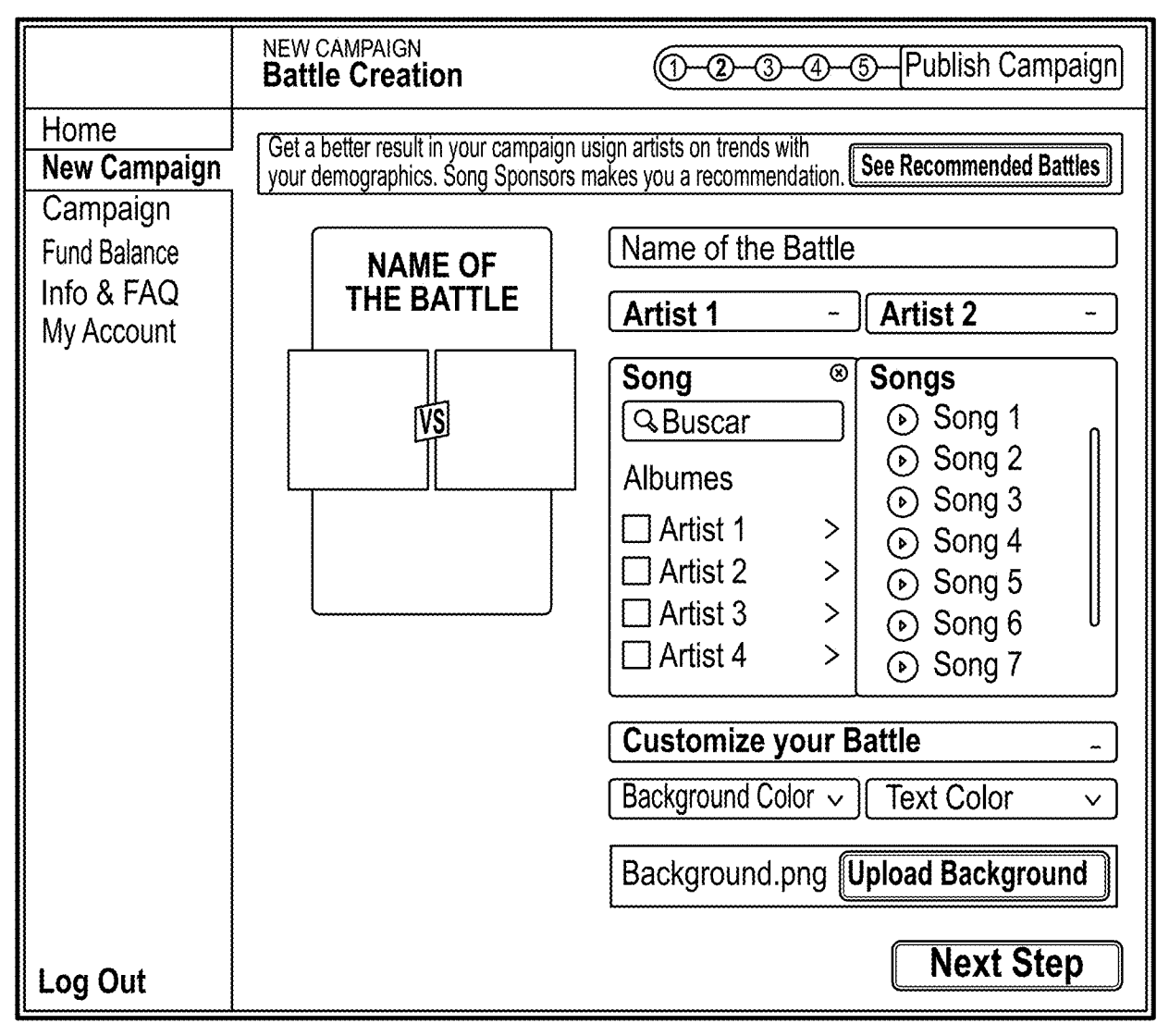

FIG. 7 illustrates additional search features for identifying songs for use. FIG. 7, for example, illustrates a search of a song "Buscar" and the resulting hits from that search to facilitate locating and selecting a song for use in a campaign.

FIG. 8 illustrates the selection and providing of video content (e.g., a video ad) for use within the campaign, as well as the selection and providing of banners and/or logos for inclusion and display during the campaign. For example, in some embodiments, the selected and uploaded video should be of a certain type (e.g., .mp4) and size (e.g., 10 MB or less). In addition, in some campaigns a selected and provided banner (e.g., an image of a certain size, such as an .png image of 600×400 and 72 dpi) can be displayed at some time during the campaign, such as before and/or after viewing the video. In some embodiments, the banner can be displayed during voting which occurs after viewing the video.

In some embodiments, a logo of the user can also be displayed during the campaign. For example, the logo can be displayed during the battle, with a complementary color to the battle (e.g., white).

Figure 9:
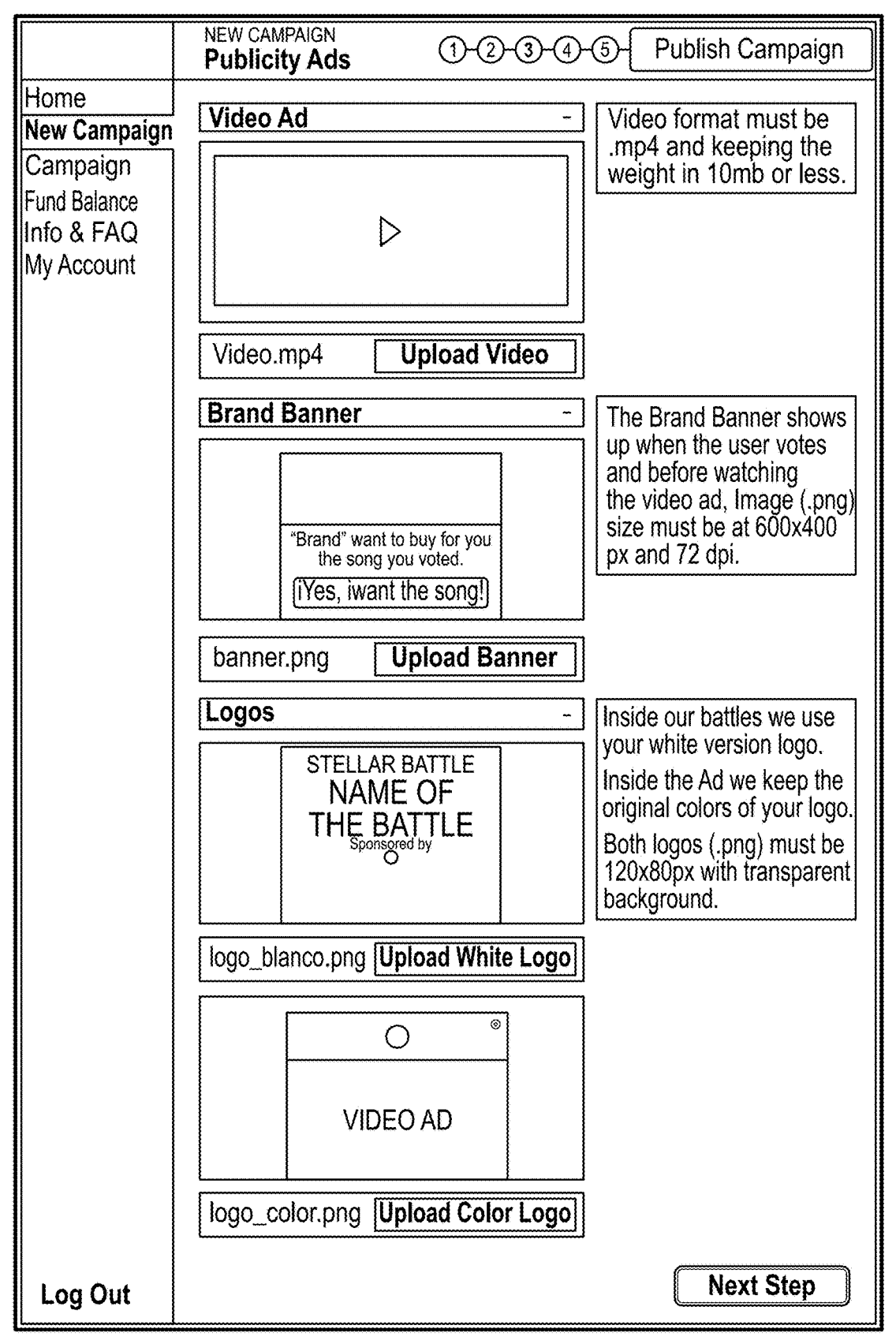

FIG. 9 illustrates exemplary battle campaign preview page that includes a preview of the video ad that has been selected and provided (e.g., uploaded), a preview of the banner that has been selected and provided (e.g., uploaded), a preview of the logo selected and provided (e.g., uploaded) for use in within the battle portion of the campaign, and a preview of the color logo that has been selected and provided (e.g., uploaded).

FIG. 10 illustrates an exemplary budget and cost input section for the system. In some embodiments, a user can input a desired reach for the campaign and/or a desired budget. As shown in FIG. 10, the costs per experience are reduced based on the virality of the campaign. Thus, for example, a virality of 4,000,000 visualizations could result in a 10% cost per experience of a virality of 100,000 users.

Figure 11:
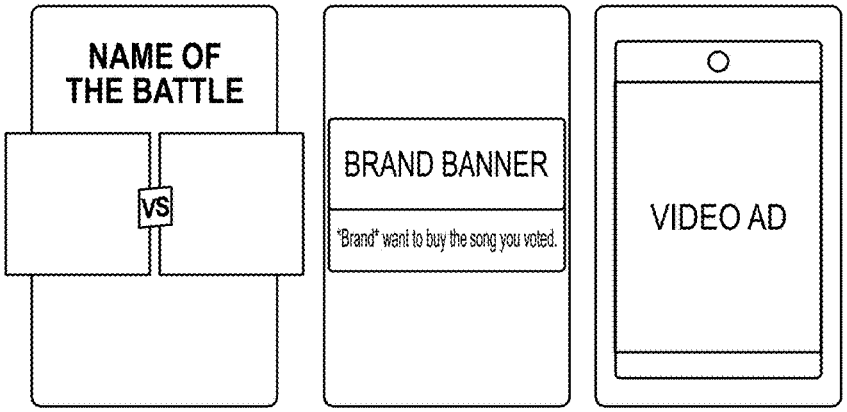
FIG. 11 illustrates an exemplary campaign preview wireframe for a battle campaign system.

FIG. 11 illustrates an exemplary battle campaign preview and detail selection page in which a user can preview, select, and/or change the details of the campaign. In some embodiments, the user can also select details associated with the time and temporality of the campaign, including a start date/time and end date/time.

Figure 12:
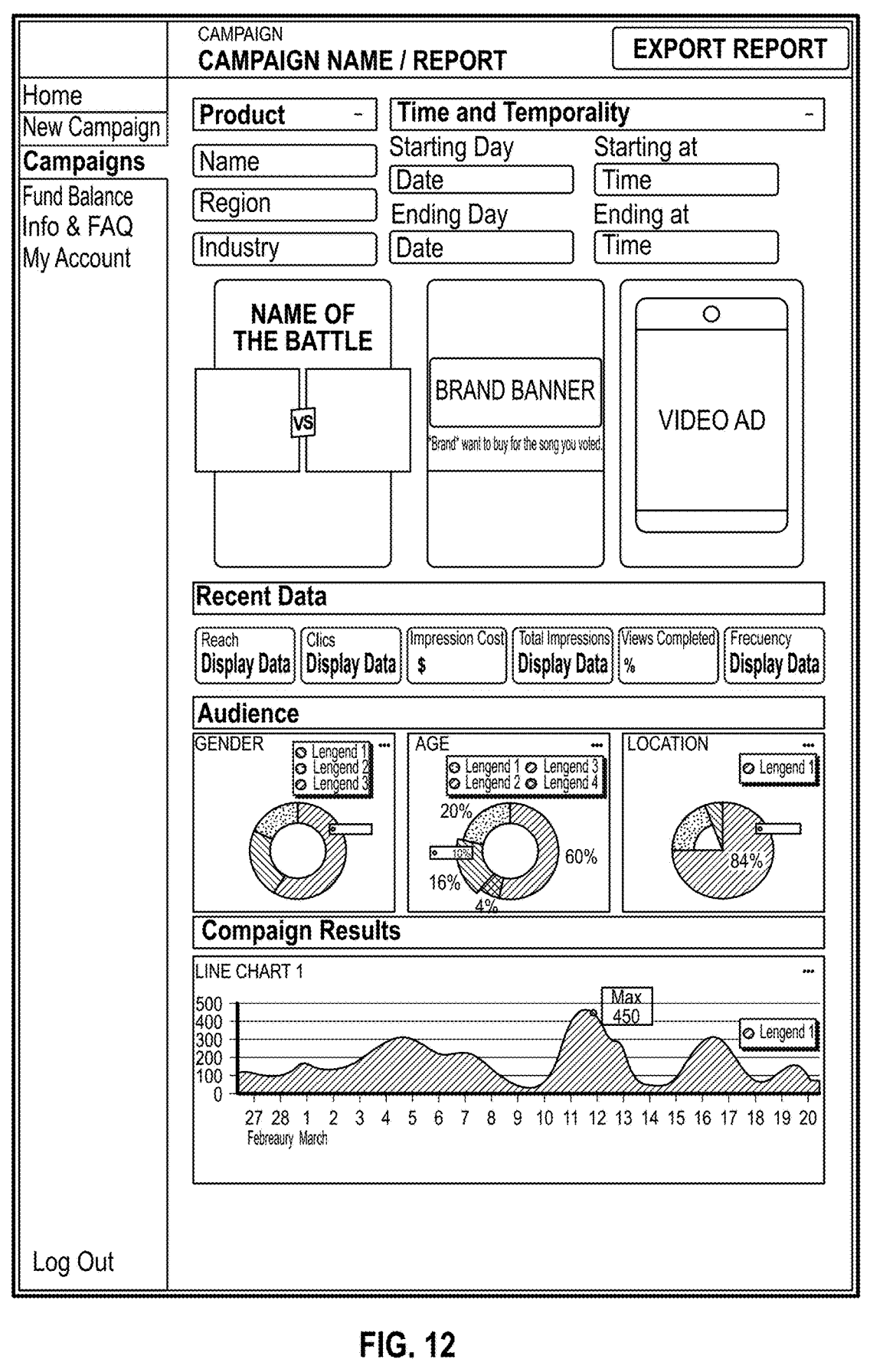

FIG. 12 illustrates an exemplary battle campaign report page of the system. The campaign report can provide details of any of the previous pages, as well as additional details relating to the results of the campaign. Such additional result details can include audience details, for example, such as gender, age, location, and/or other known parameters associated with the viewing audience. This information can be provided numerically and/or graphically. In addition, the campaign results can show the number of visualizations over time, numerically or graphically, such as by a graphed timeline as shown in FIG. 12.

Figure 13:
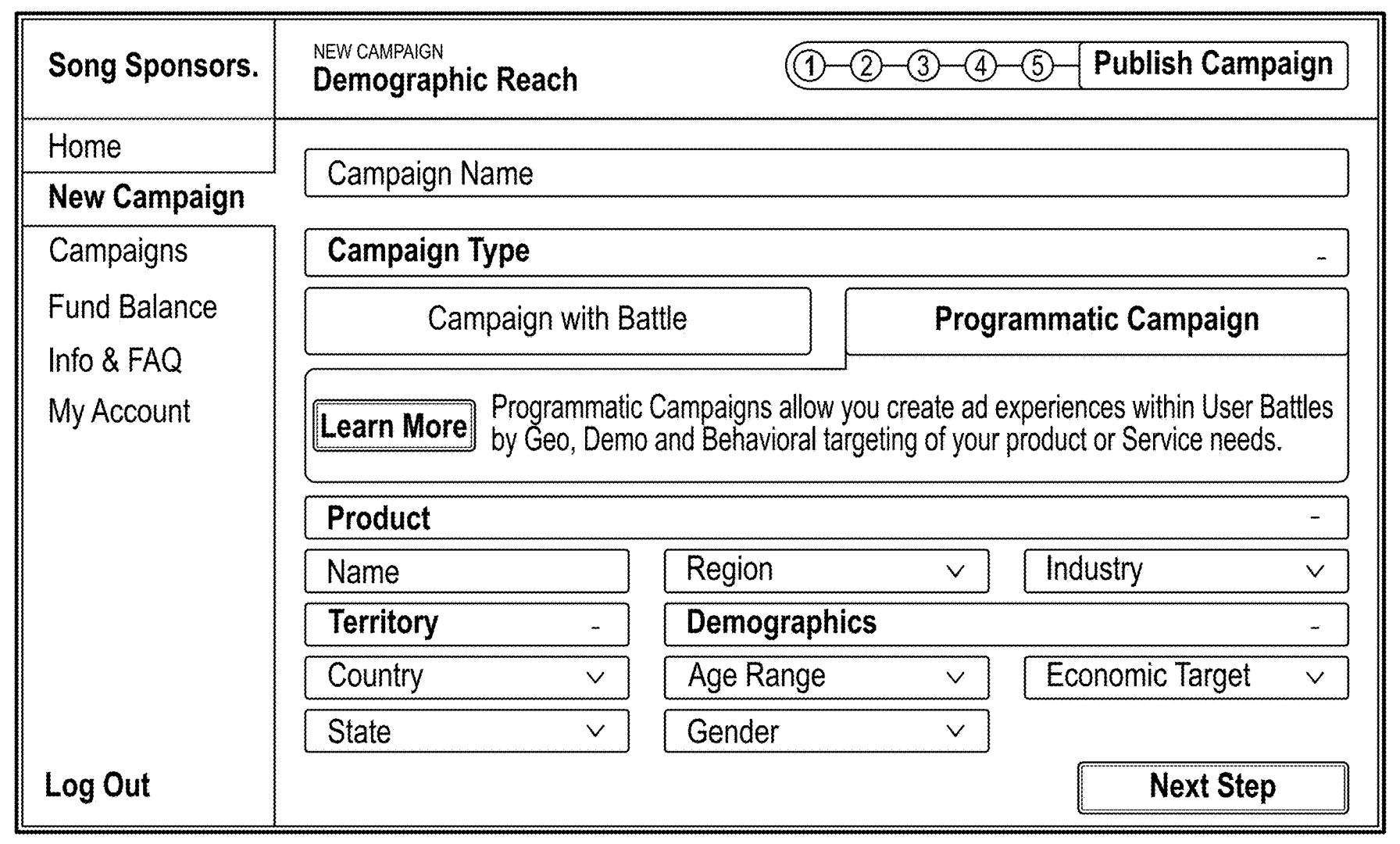

FIG. 13 illustrates another exemplary wireframe for creating a campaign. Like FIG. 5, FIG. 13 illustrates exemplary options, including naming the campaign and selecting the type of campaign which can be a "campaign with battle" or a "programmatic campaign." In addition, various regional and demographic information about the target market can be selected. For example, a country or state can be selected along with age ranges, genders, and economic targets for the intended viewer.

FIGS. 14-18 illustrate the operation of a programmatic campaign in which there is not a battle between two or more songs. Instead, a video ad is included with similar content described above, song, logo, banner; however, there is no voting because there is only one selected song. Like the battle campaign, however, virality affects the cost per engagement.

FIG. 14 illustrates the selection and providing of video content (e.g., a video ad) for use within the campaign, as well as the selection and providing of banners and/or logos for inclusion and display during the campaign. For example, in some embodiments, the selected and uploaded video should be of a certain type (e.g., .mp4) and size (e.g., 10 MB or less). In addition, in some campaigns a selected and provided banner (e.g., an image of a certain size, such as an .png image of 600×400 and 72 dpi) can be displayed at some time during the campaign, such as before and/or after viewing the video. In some embodiments, a logo of the user can also be displayed during the campaign.

Figure 15:
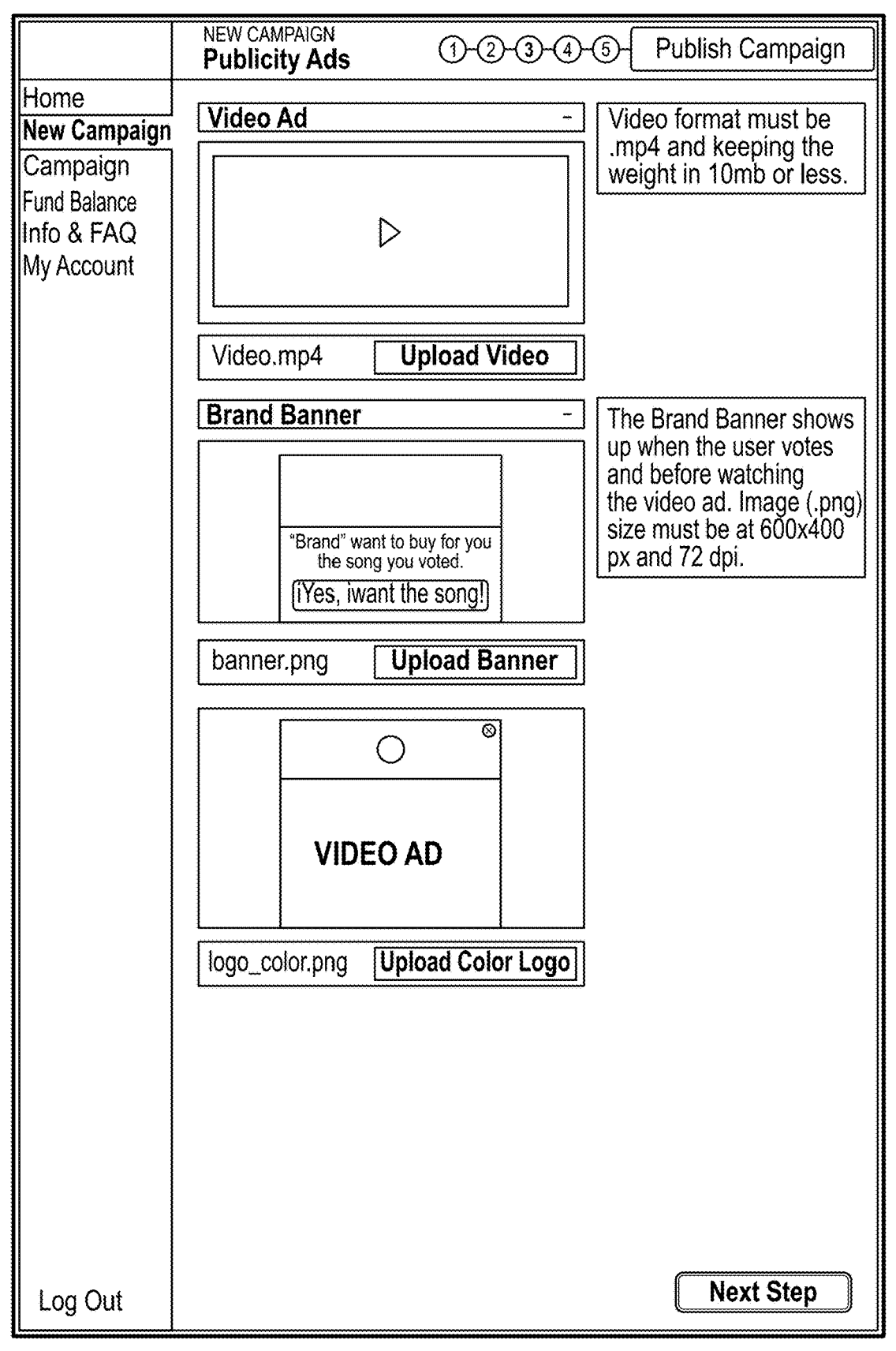

FIG. 15 illustrates exemplary campaign preview page that includes a preview of the video ad that has been selected and provided (e.g., uploaded), a preview of the banner that has been selected and provided (e.g., uploaded), a preview of the logo selected and provided (e.g., uploaded) for use in within the campaign, and a preview of the color logo that has been selected and provided (e.g., uploaded).

FIG. 16 illustrates an exemplary budget and cost input section for the system. Like with the battle campaign, in some embodiments of the programmatic campaign, a user can input a desired reach for the campaign and/or a desired budget. As shown in FIG. 16, the costs per experience are reduced based on the virality of the campaign. Thus, for example, a virality of 4,000,000 visualizations could result in a 10% cost per experience of a virality of 100,000 users.

Figure 17:
FIG. 17 illustrates an exemplary campaign preview wireframe for a programmatic campaign system.

FIG. 17 illustrates an exemplary programmatic campaign preview and detail selection page in which a user can preview, select, and/or change the details of the campaign. In some embodiments, the user can also select details associated with the time and temporality of the campaign, including a start date/time and end date/time.

Figure 18:
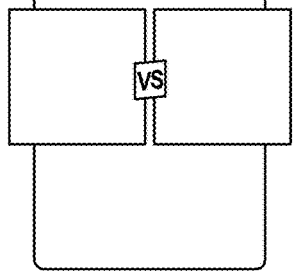
FIG. 18 illustrates an exemplary campaign report wireframe for a programmatic campaign system.

FIG. 18 illustrates an exemplary programmatic campaign report page of the system. The campaign report can provide details of any of the previous pages, as well as additional details relating to the results of the campaign. Such additional result details can include audience details, for example, such as gender, age, location, and/or other known parameters associated with the viewing audience. This information can be provided numerically and/or graphically. In addition, the campaign results can show the number of visualizations over time, numerically or graphically, such as by a graphed timeline as shown in FIG. 18.

FIG. 19 illustrates an exemplary user's campaign menu. In this view, a user can view campaigns by all, pending, ended, and/or active. Reports can be generated for each, as described herein, for additional details of every campaign, whether in progress, ended, or in development. All details of each campaign can be displayed numerically, textually, and/or graphically as desired.

A plurality of campaign videos can also be provided for playback to the plurality of audience members, thereby allowing for a competition in a tournament manner. In other words, pairs of musical selections can compete in brackets until there is a single winner based on the votes received. The tournament can include a bracket of at least four musical selections. In some embodiments, the tournament comprises a bracket of four, eight, sixteen, thirty-two, or sixty-four musical selections. One of the musical selections can be selected from votes of the audience members as a winner of the tournament.

The systems and methods disclosed herein can include calculating and displaying to the user real-time analytics of the one or more current campaigns. Thus, for example, the method can include receiving a modification to the one or more campaigns from the user based on the real time analytics to adjust a return on investment by increasing or decreasing a budget based on the flight and frequency of virality of an active one of the one or more campaigns. The method can also include calculating and displaying to the user real-time analytics of the one or more past campaigns.

In some embodiments, two or more users can compete by selecting, individually, respective music selections. In this manner, a first user selects first selection from the database and a second user selects a second selection from the database. The two selections are combined, with one or more videos (either a video from the first user, the second user, or both) into a campaign video and the campaign video is provided for playback to the plurality of audience members. Votes are received as described elsewhere and the vote reflecting a preference for the first selection or the second selection resulting in a winner that is associated with the first or second user. In this manner, at least two users and at least two musical selections can be involved in a battle campaign.

In other embodiments, the database of musical selections comprises multiple catalogs of audio files to be available for intramural distribution within system, with separate servers and firewalls and separate revenue splits. The method can also include providing the ability for publishing rights organizations to access, monitor, track, and/or modify all music publishing right holders of the musical selections in the database, accurately and in real time. The method can include receiving new music publishing right holders and musical selections from the publishing rights organizations, and/or providing publishing rights organizations revenue information, with accurate accounting for each publishing right holder and musical selection, accurately and in real time.

Exemplary Computing Systems and Networks for Implementing the Viral Pricing Systems and Methods Various systems for encouraging complete playback of media files in the manners described above can be provided. In some embodiments, these systems may be implemented or performed, at least in part, by software stored on one or more tangible computer-readable media (e.g., one or more optical media discs, volatile memory or storage components (such as DRAM or SRAM), or nonvolatile memory or storage components (such as hard drives)) and executed on one or more computing systems. The computing systems can include one or more central processing units (CPUs) and a memory, such as random access memory (RAM) for temporary storage of information and/or a read only memory (ROM) for permanent storage of information, and a mass storage device, such as a hard drive, diskette, or optical media storage device. Typically, the modules of the computing system are connected to the computer using a standards-based bus system, such as, for example, Peripheral Component Interconnect (PCI), Microchannel, SCSI, Industrial Standard Architecture (ISA) and Extended ISA (EISA) architectures. The computing system may also include one or more commonly available input/output (I/O) devices and interfaces, such as a keyboard, a mouse, and/or a touchpad. In one embodiment, the I/O devices and interfaces include one or more display devices, such as a monitor, that allows the visual presentation of data to a user. More particularly, a display device provides for the presentation of Graphical User Interfaces (GUIs), application software data, and multimedia presentations, for example. The computing system may also provide a communications interface to various external devices.

Such software can be executed on a single computer or on a networked computer (e.g., via the Internet, a wide-area network, a local-area network, a client-server network, or other such network). The systems and methods disclosed herein can also be performed using cloud computing, a form of Internet-based computing, whereby shared resources, software and information are provided to computers and other devices on-demand. The software embodiments disclosed herein can be described in the general context of computer-executable instructions, such as those included in program modules, which can be executed in a computing environment on a target real or virtual processor. The computing system may run on a variety of computing devices, such as, for example, a server, a Windows server, a Structure Query Language server, a Unix server, a personal computer, a mainframe computer, a laptop computer, a cell phone, a personal digital assistant, a kiosk, an audio player, and so forth. The computing system is generally controlled and coordinated by operating system software. Conventional operating systems control and schedule computer processes for execution, perform memory management, provide file system, networking, and I/O services, and provide a user interface, such as a graphical user interface, among other things.

Furthermore, any of the software embodiments (comprising, for example, computer-executable instructions for causing a computer to perform any of the disclosed methods) can be transmitted, received, or accessed through a suitable communication means. Similarly, any data structure, data file, intermediate result, or final result created or modified using any of the disclosed methods can be transmitted, received, or accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means now known or unknown. Moreover, any data structure, data file, intermediate result, or final result produced by any of the disclosed methods can be displayed to a user using a suitable display device (e.g., a computer monitor or display). Such displaying can be performed as part of a computer-implemented method of performing any of the disclosed methods.

Figure 20:
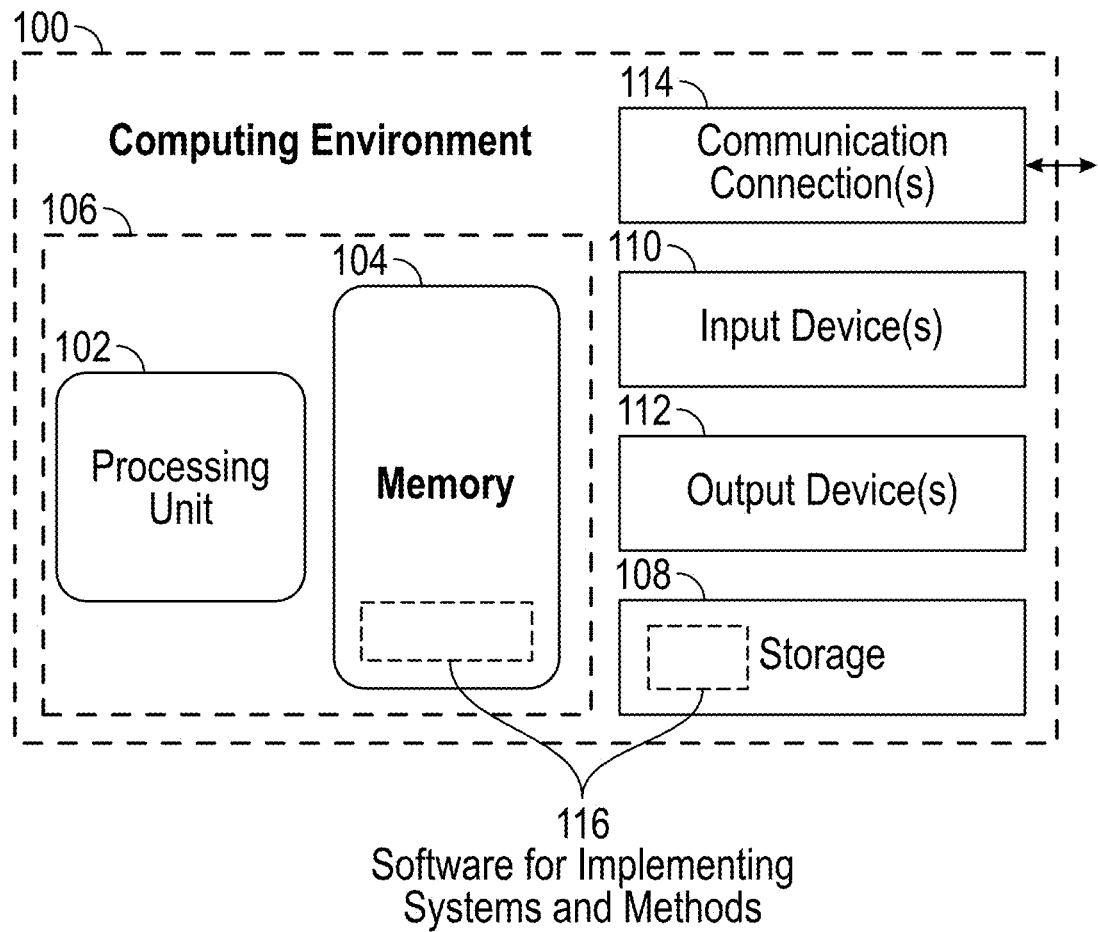
FIG. 20 is a schematic block diagram of an exemplary computing system on which certain embodiments of the systems and methods disclosed herein can be implemented.

FIG. 20 illustrates a generalized example of a suitable computing environment 100 in which the described embodiments of systems and methods can be implemented. The computing environment 100 is not intended to suggest any limitation as to scope of use or functionality, as the methods described herein can be implemented in diverse general-purpose or special-purpose computing environments.

With reference to FIG. 20, the computing environment 100 includes at least one processing unit 102 and memory 104. In FIG. 20, this most basic configuration 106 is included within a dashed line. The processing unit 102 executes computer-executable instructions and may be a real or a virtual processor. In a multi-processing system, multiple processing units execute computer-executable instructions to increase processing power. The memory 104 may be volatile memory (e.g., registers, cache, RAM), non-volatile memory (e.g., ROM, EEPROM, flash memory, etc.), or some combination of the two. The memory 104 stores software 116 implementing one or more of the systems described herein.

The computing environment may have additional features. For example, the computing environment 100 includes storage 108, one or more input devices 110, one or more output devices 112, and one or more communication connections 114. An interconnection mechanism (not shown) such as a bus, controller, or network interconnects the components of the computing environment 100. Typically, operating system software (not shown) provides an operating environment for other software executing in the computing environment 100, and coordinates activities of the components of the computing environment 100.

The storage 108 may be removable or non-removable, and includes magnetic disks, magnetic tapes or cassettes, CD-ROMs, DVDs, or any other medium which can be used to store information and which can be accessed within the computing environment 100. The storage 108 can store instructions for the software 116 implementing any of the described systems and methods.

The input device(s) 110 can be a touch input device such as a keyboard, mouse, pen, or trackball, a voice input device, a scanning device, or another device that provides input to the computing environment 100. For audio or video encoding, the input device(s) 110 can be a sound card, video card, TV tuner card, or similar device that accepts audio or video input in analog or digital form, or a CD-ROM or CD-RW that reads audio or video samples into the computing environment 100. The output device(s) 112 can be a display or another device that provides output from the computing environment 100 to view the selected media content.

The communication connection(s) 114 enable communication over a communication medium to another computing entity. The communication medium is not a storage medium but conveys information such as computer-executable instructions, resource and construction project information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The various methods disclosed herein can be described in the general context of computer-readable media. Computer-readable media are any available media that can be accessed within or by a computing environment. By way of example, and not limitation, with the computing environment 100, computer-readable media include tangible computer-readable storage media such as memory 104 and storage 108.

Figure 21:
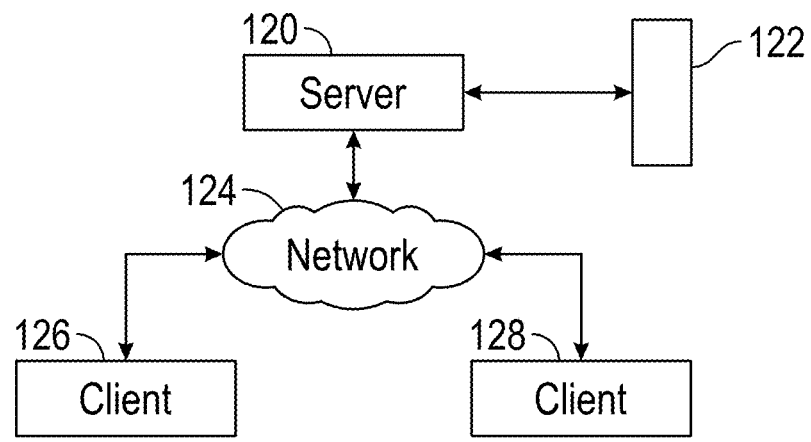
FIG. 21 is a block diagram illustrating a computer network that can be used to perform at least some of the embodiments of the systems and methods disclosed herein.

Any of the aspects of the technology described herein can also be performed using a distributed computer network. FIG. 21 shows a simplified embodiment of one such exemplary network. A server computer 120 can have an associated storage device 122 (internal or external to the server computer). For example, the server computer 120 can be configured to perform the calculations and analysis of information according to any of the disclosed embodiments. The server computer 120 can be coupled to a network, shown generally at 124, which can comprise, for example, a wide-area network, a local-area network, a client-server network, the Internet, or other such network. One or more client computers, such as those shown at 126, 128, may be coupled to the network 124 using a network protocol. The work may also be performed on a single, dedicated workstation, which has its own memory and one or more CPUs.

Figure 22:
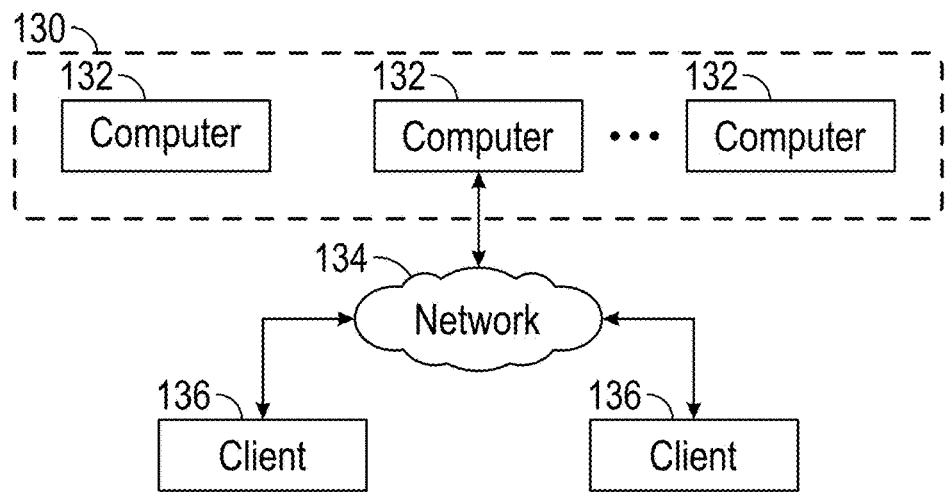
FIG. 22 is a block diagram illustrating another computer network that can be used to perform at least some of the embodiments of the systems and methods disclosed herein.

FIG. 22 shows another exemplary network, such as a network which can send and receive information and media content to the computing devices 26, 28, 30. One or more computers 132 communicate via a network 134 and form a computing environment 130 (e.g., a distributed computing environment). Each of the computers 132 in the computing environment 130 can be used to perform at least a portion of the calculation techniques according to any of the disclosed embodiments. The network 134 in the illustrated embodiment is also coupled to one or more client computers 136.

Figure 23:
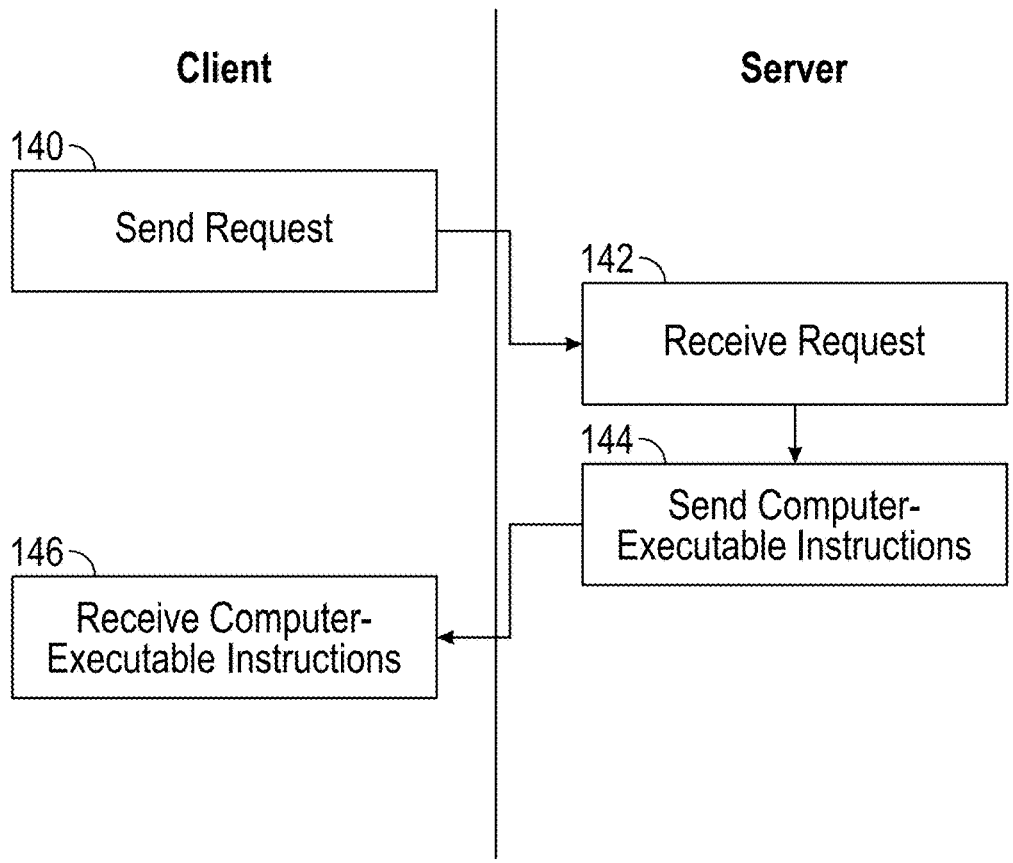
FIG. 23 is a block diagram illustrating how the computer networks of FIG. 21 or 22 can be used to perform certain aspects of the systems and methods disclosed herein.
Figure 24:
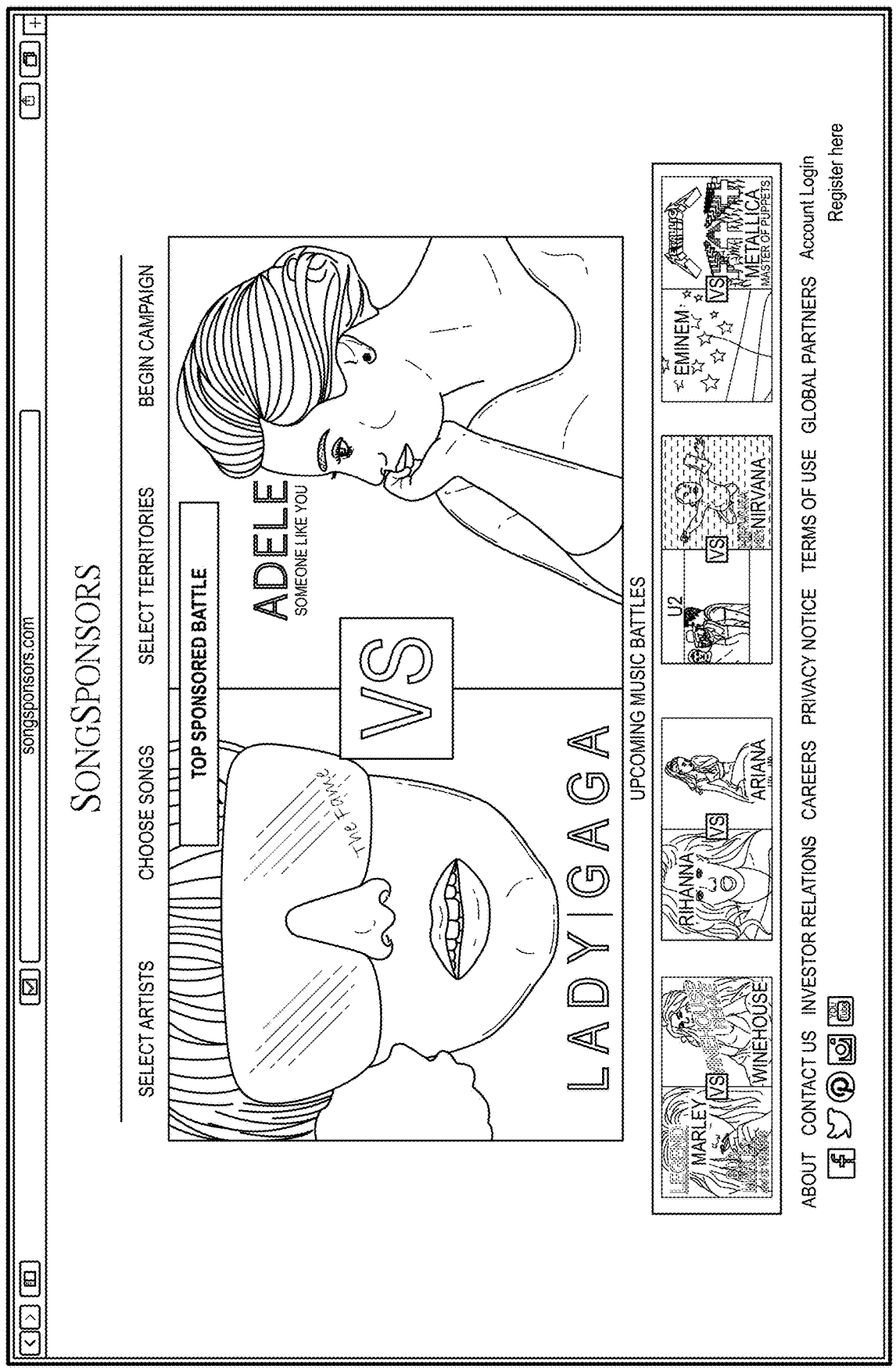
FIG. 24 illustrates an exemplary sponsored battle based on the current disclosure.
Figure 25:
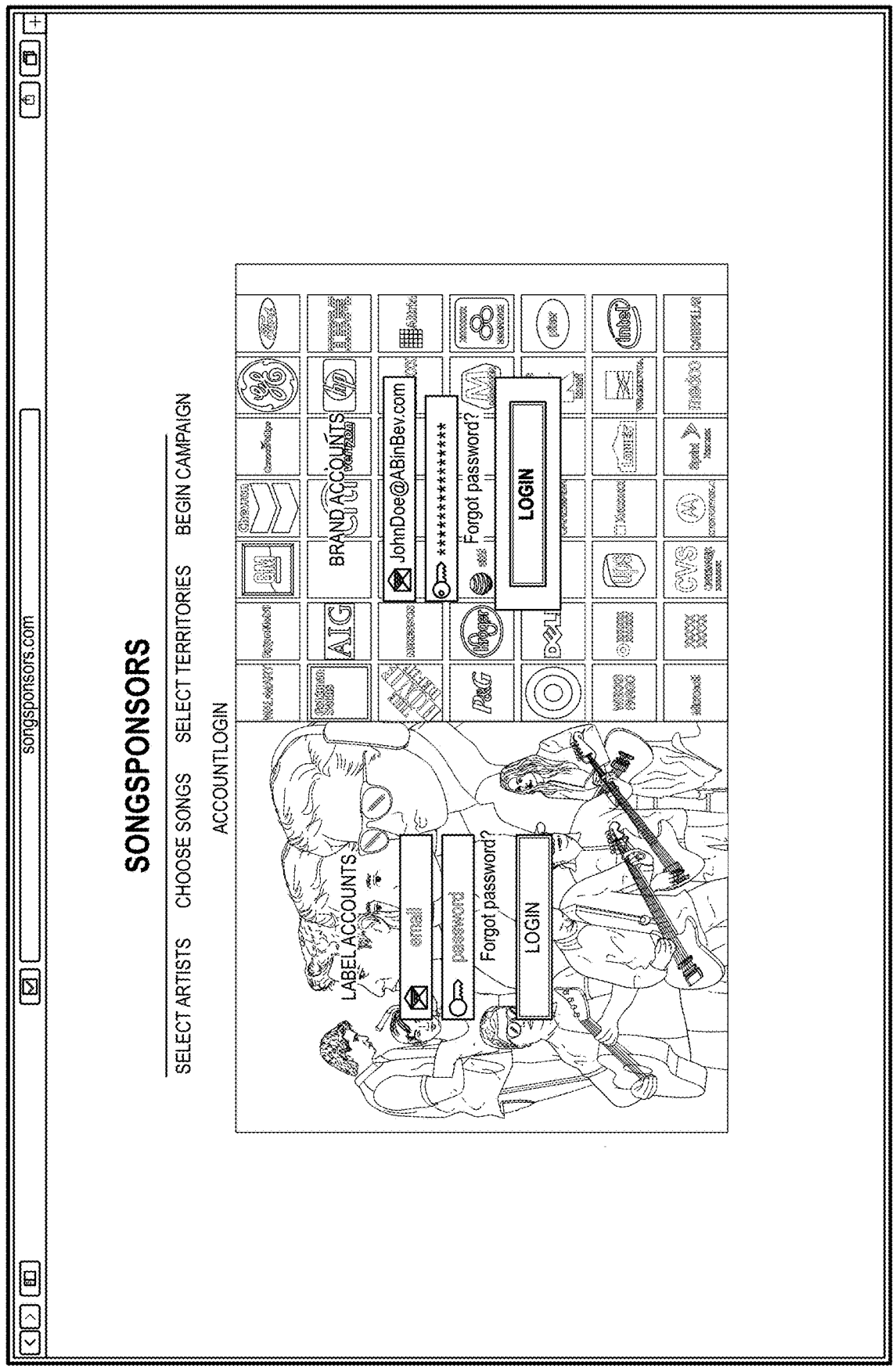
FIG. 25 illustrates an exemplary account login screenshot based on the current disclosure.
Figure 26:
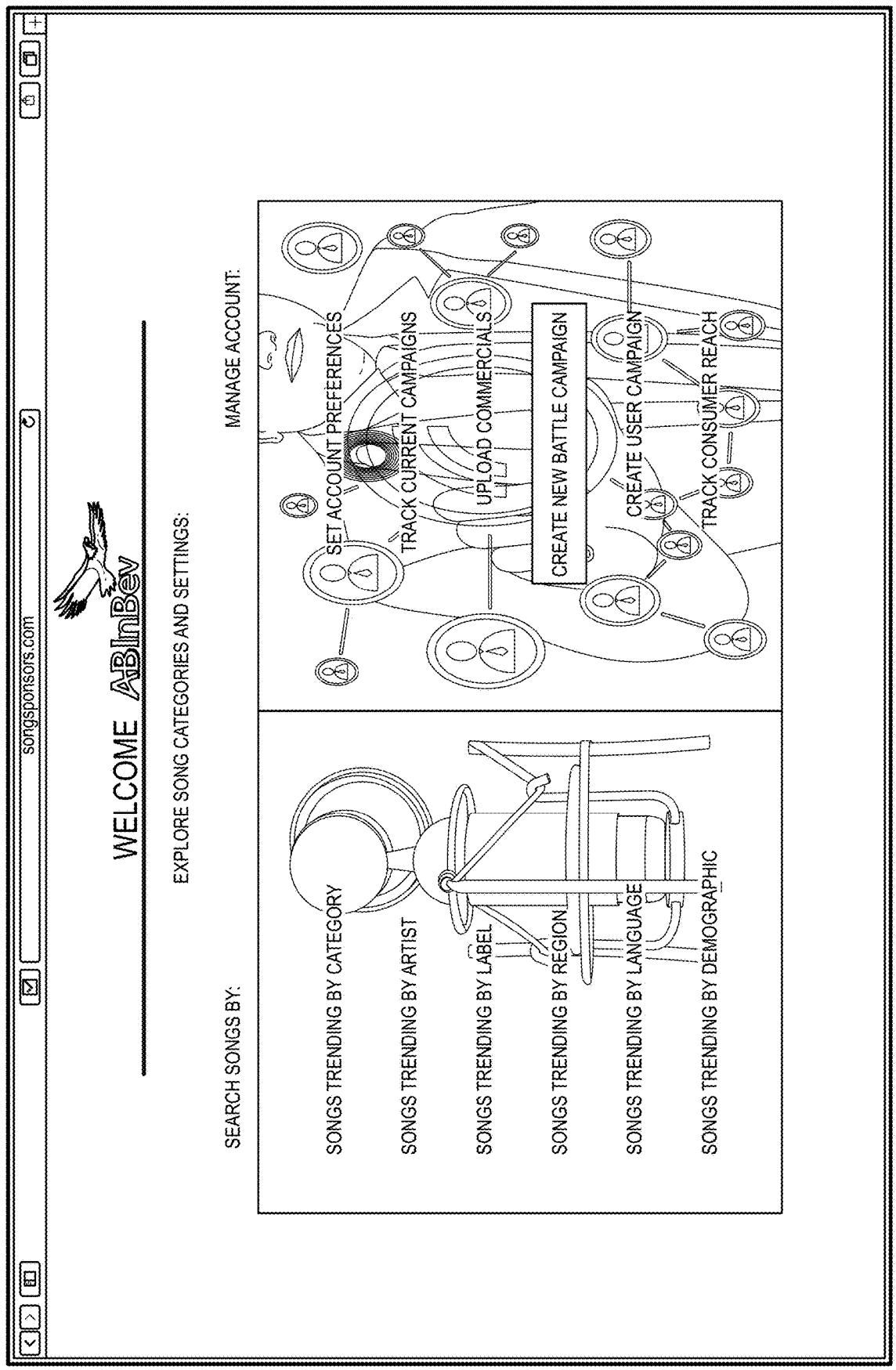
FIG. 26 illustrates an exemplary screenshot of exploring song categories and settings based on the current disclosure.
Figure 27:
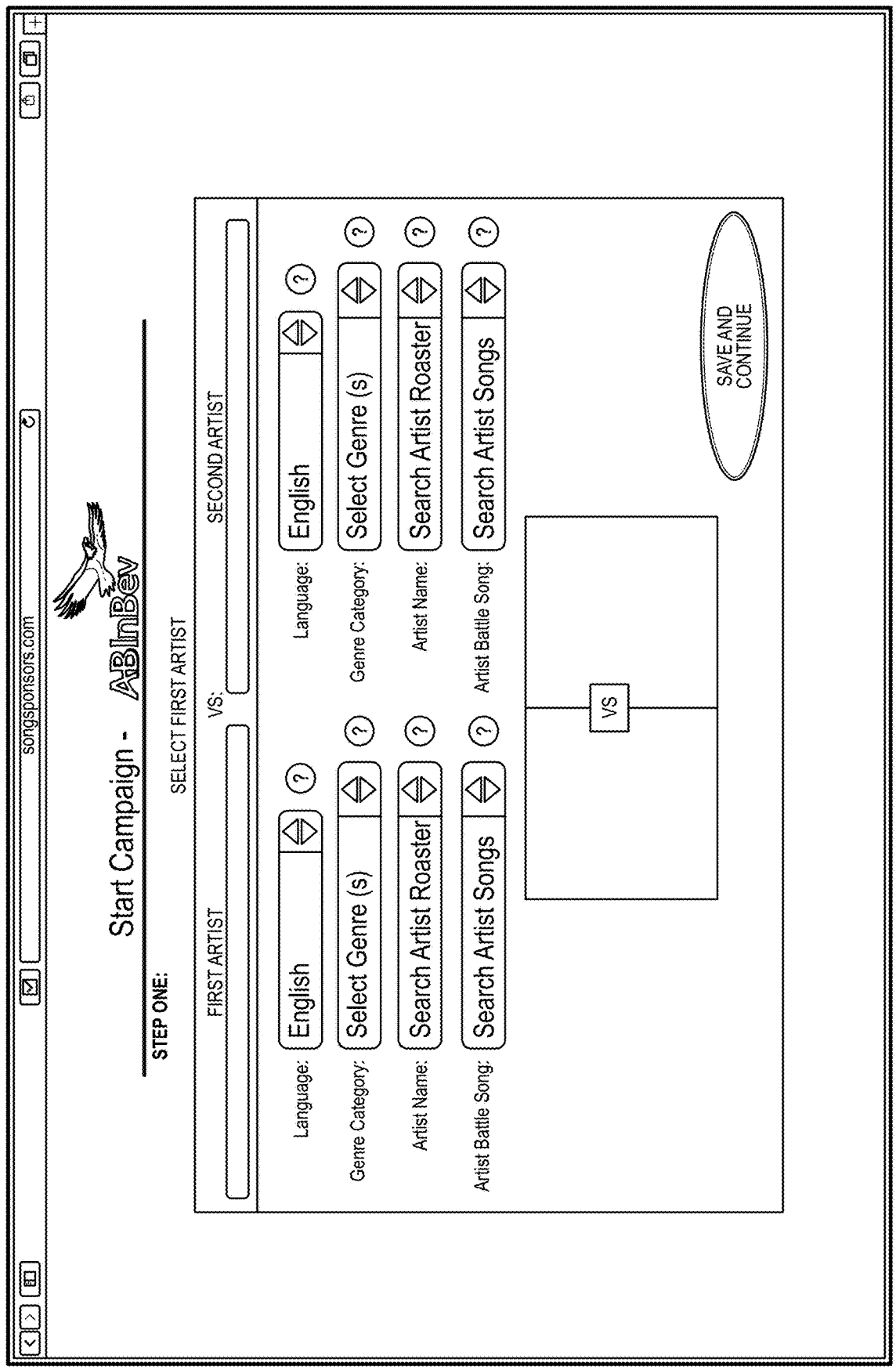
FIG. 27 illustrates an exemplary screenshot of selecting artists to start a campaign based on the current disclosure.
Figure 28:
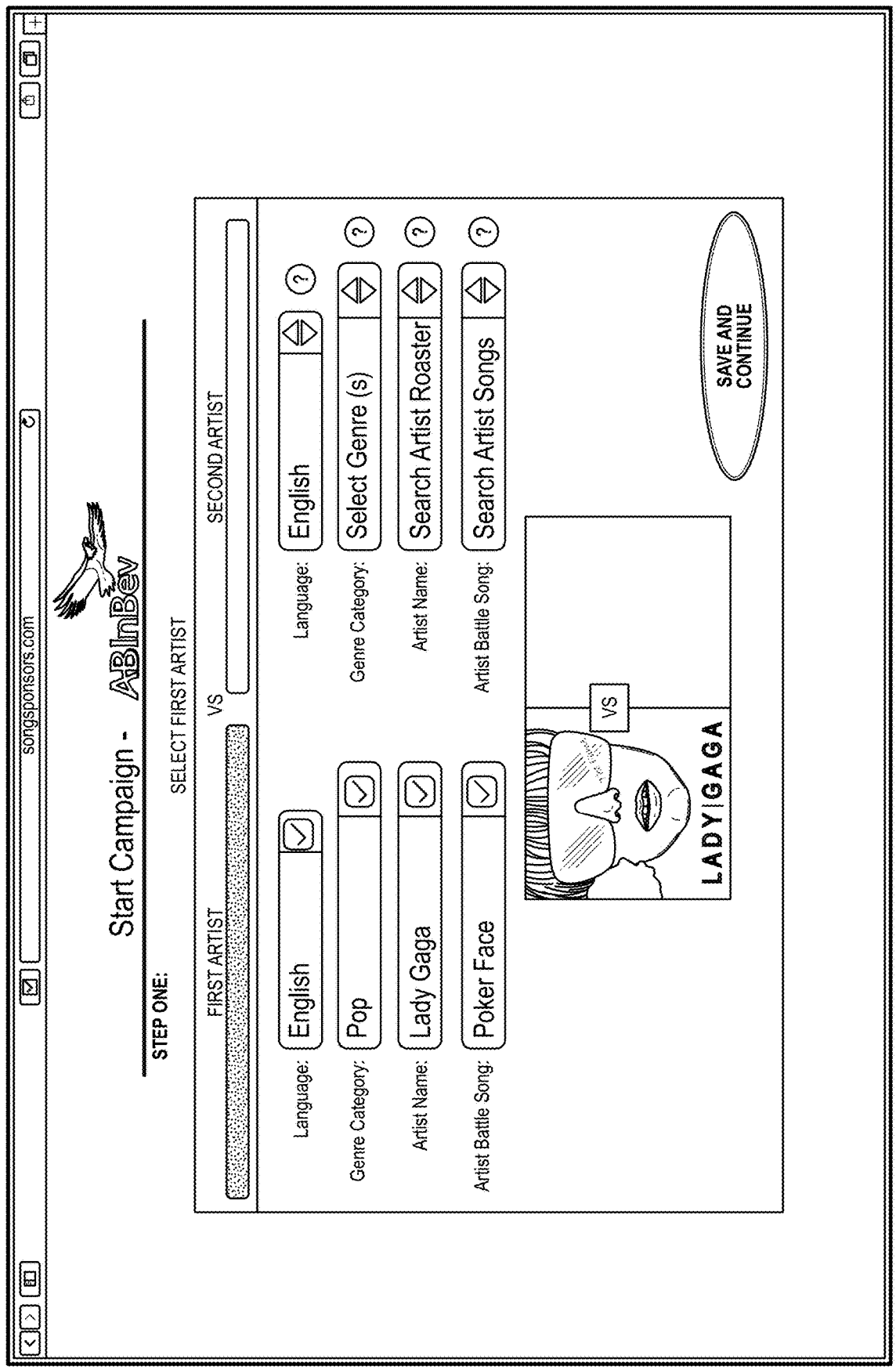
FIG. 28 illustrates another exemplary screenshot of selecting artists to start a campaign based on the current disclosure.
Figure 29:
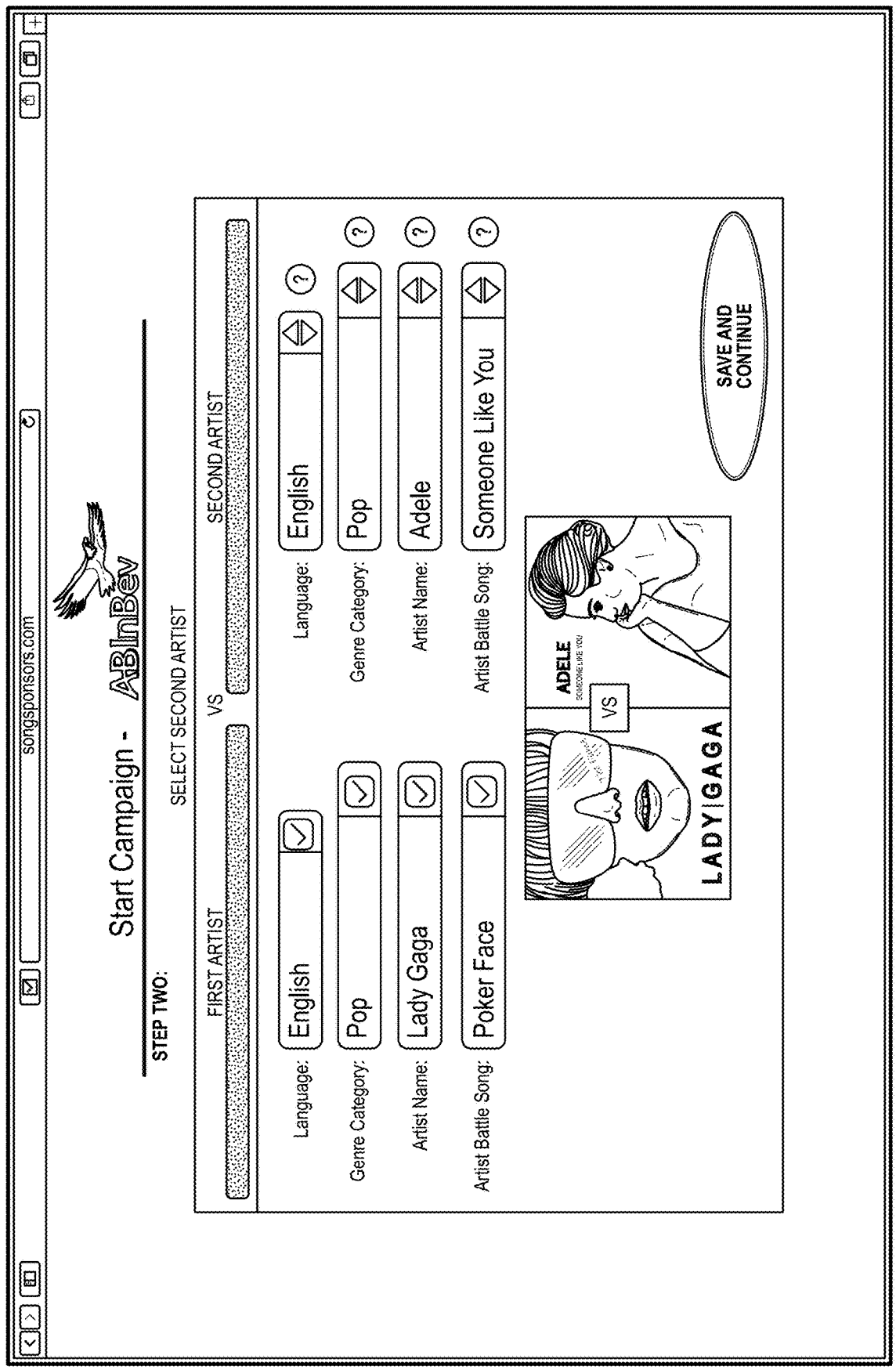
FIG. 29 illustrates another exemplary screenshot of selecting artists to start a campaign based on the current disclosure.
Figure 30:
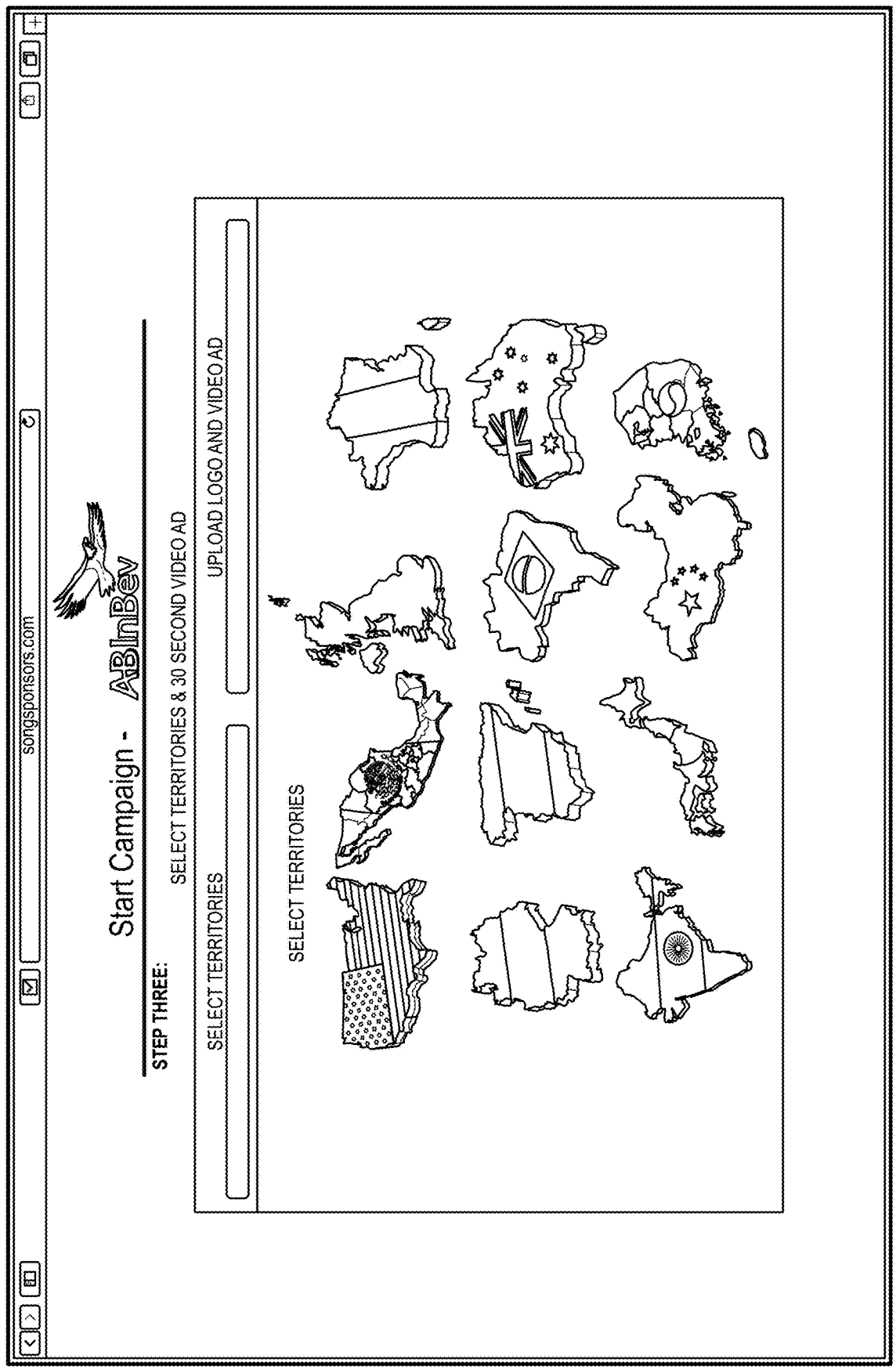
FIG. 30 illustrates an exemplary screenshot of selecting territories and providing content to start a campaign based on the current disclosure.
Figure 31:
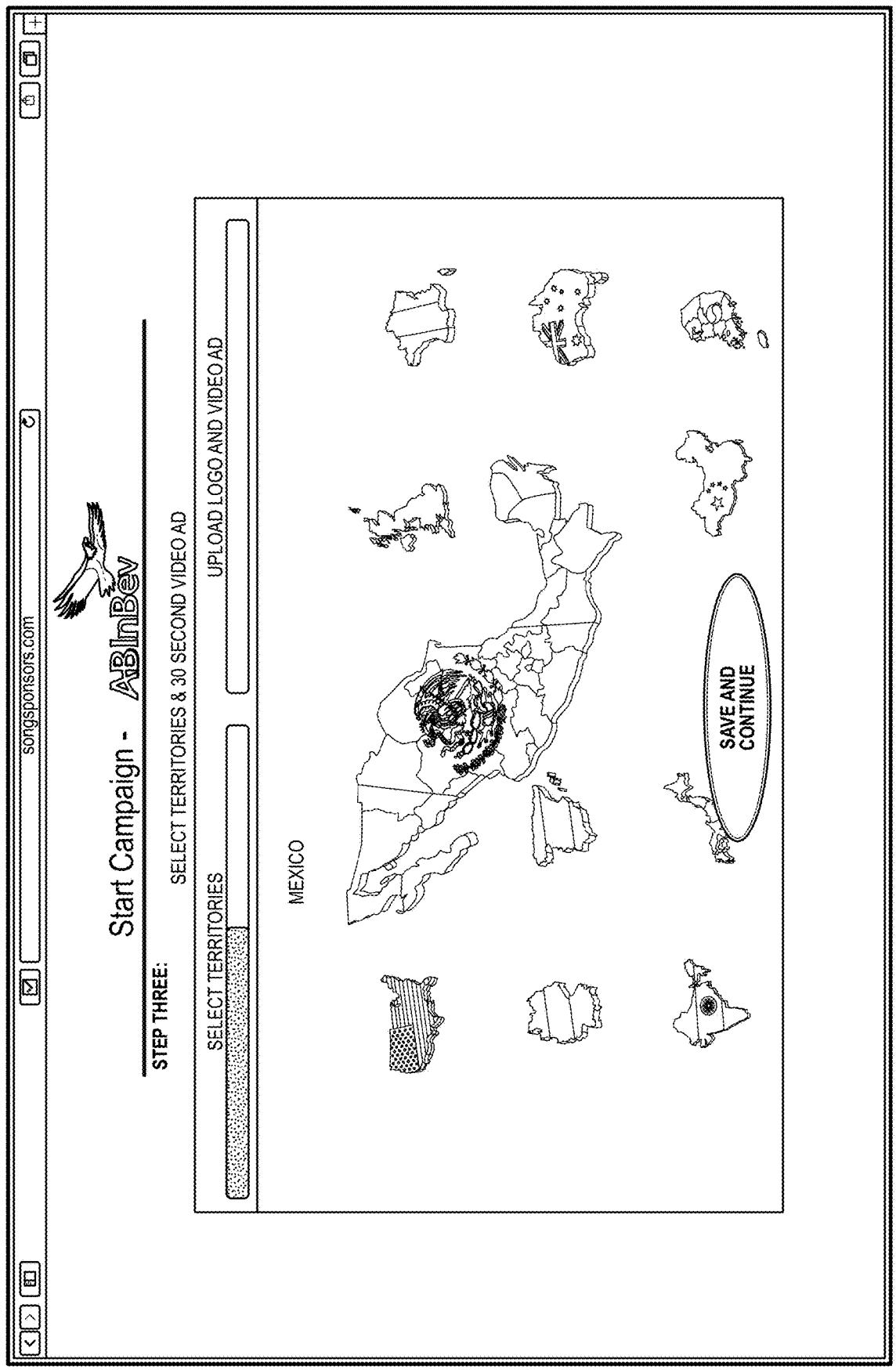
FIG. 31 illustrates another exemplary screenshot of selecting territories and providing content to start a campaign based on the current disclosure.
Figure 32:
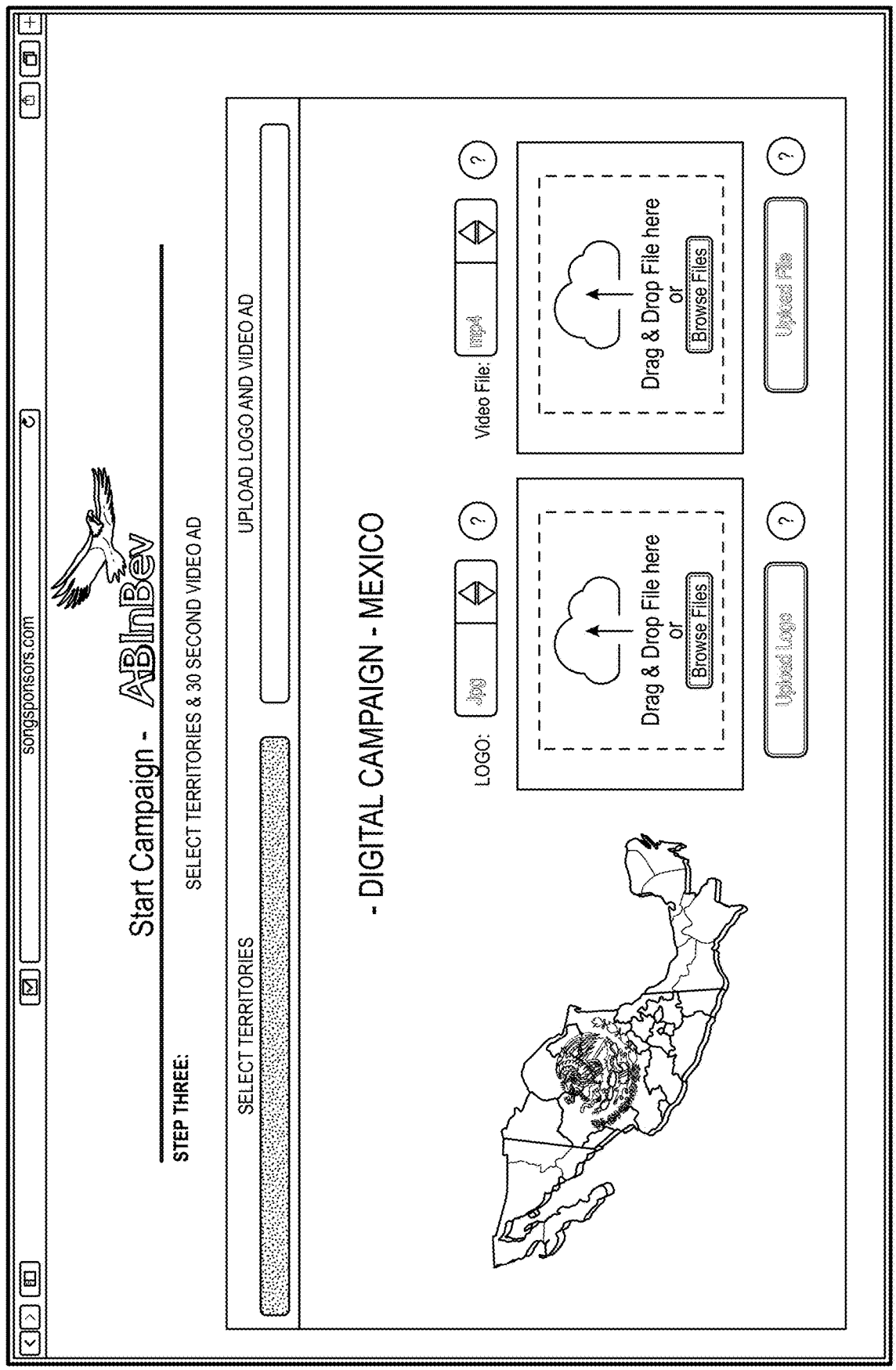
FIG. 32 illustrates another exemplary screenshot of selecting territories and providing content to start a campaign based on the current disclosure.
Figure 33:
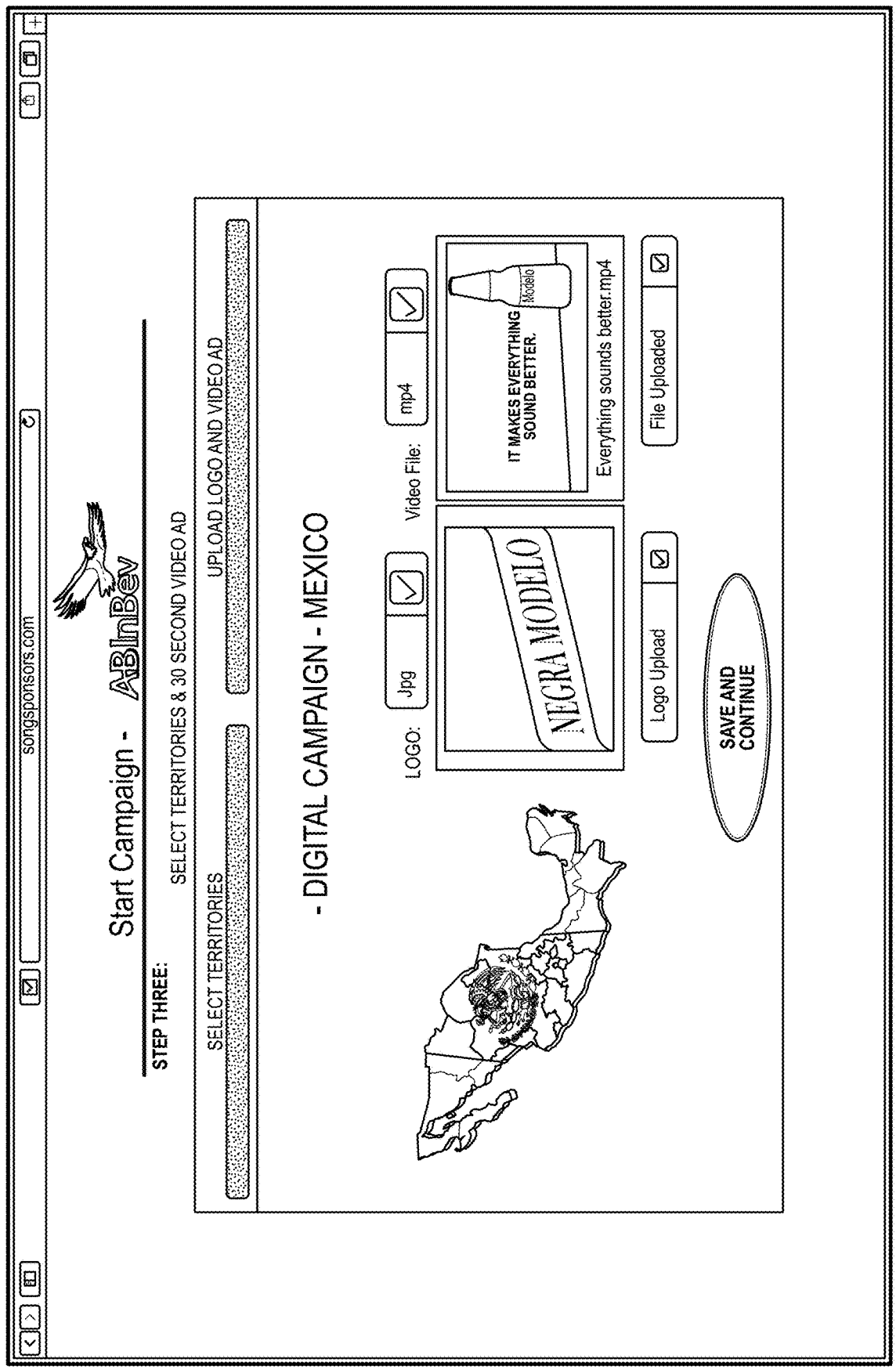
FIG. 33 illustrates another exemplary screenshot of selecting territories and providing content to start a campaign based on the current disclosure.
Figure 34:
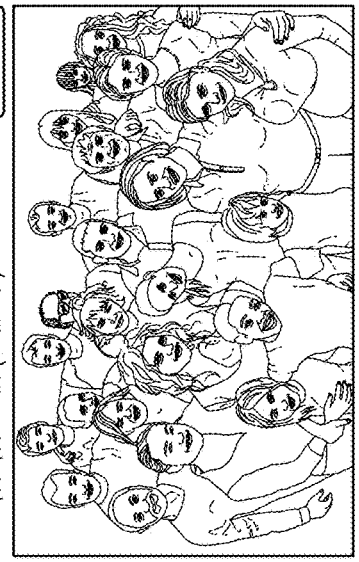
FIG. 34 illustrates an exemplary screenshot of selecting budgets and related selections to start a campaign based on the current disclosure.
Figure 35:
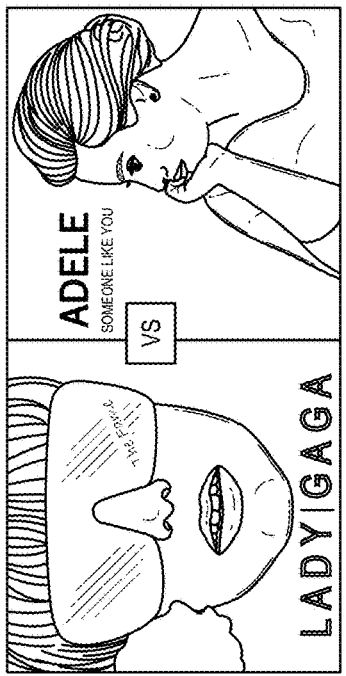
FIG. 35 illustrates another exemplary screenshot of selecting budgets and related selections to start a campaign based on the current disclosure.
Figure 36:
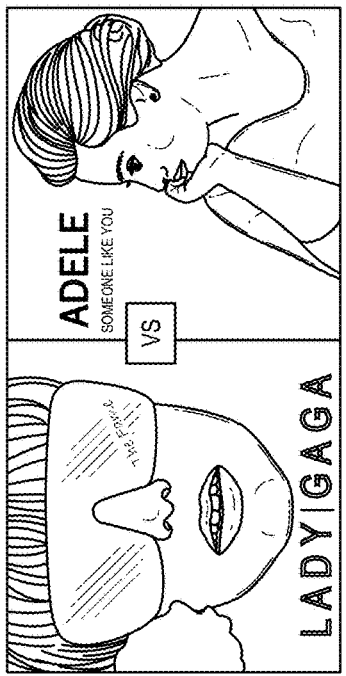
FIG. 36 illustrates another exemplary screenshot of selecting budgets and related selections to start a campaign based on the current disclosure.
Figure 38:
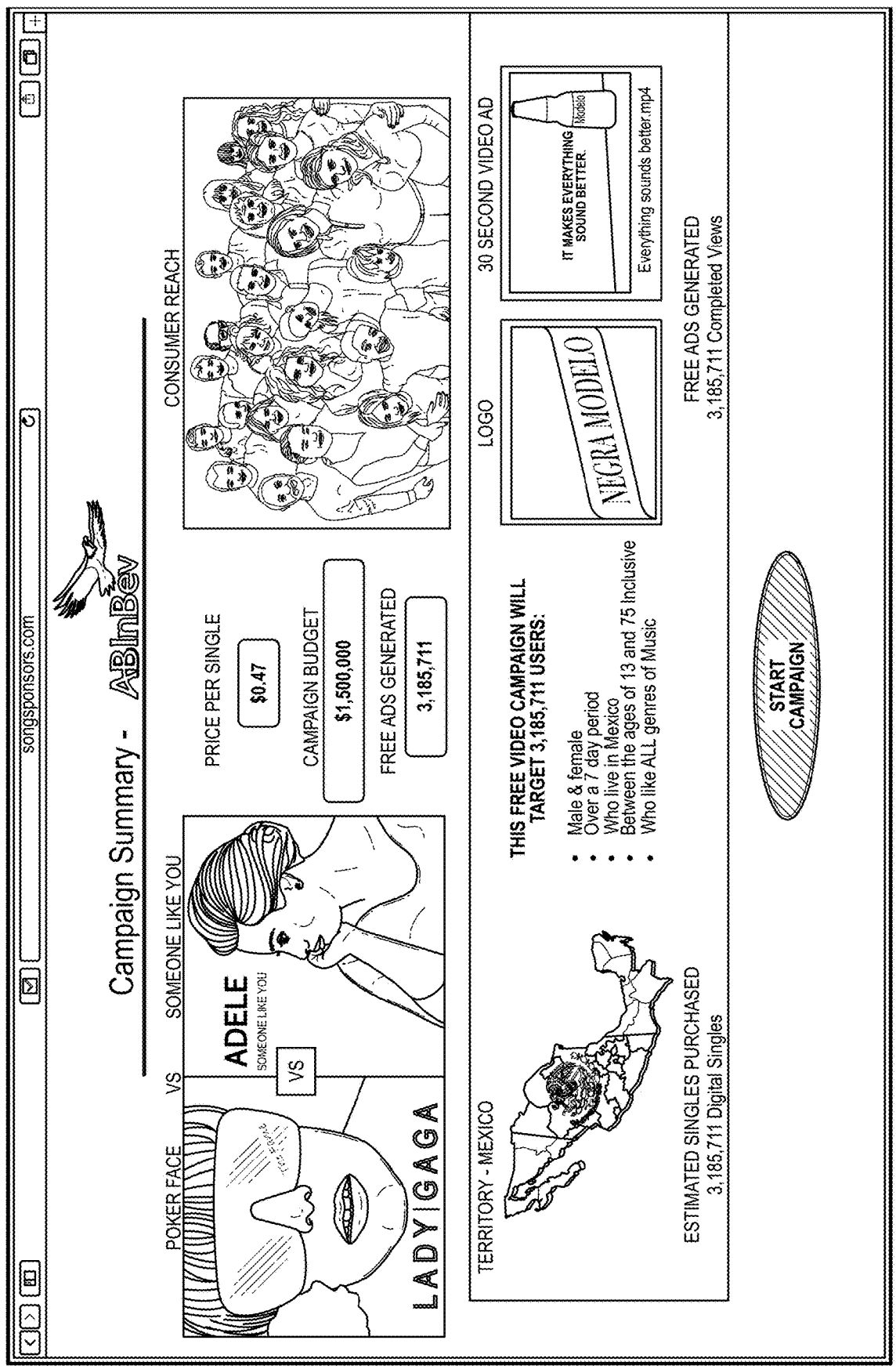
FIG. 38 illustrates another exemplary screenshot of a campaign summary based on the current disclosure.
Figure 39:
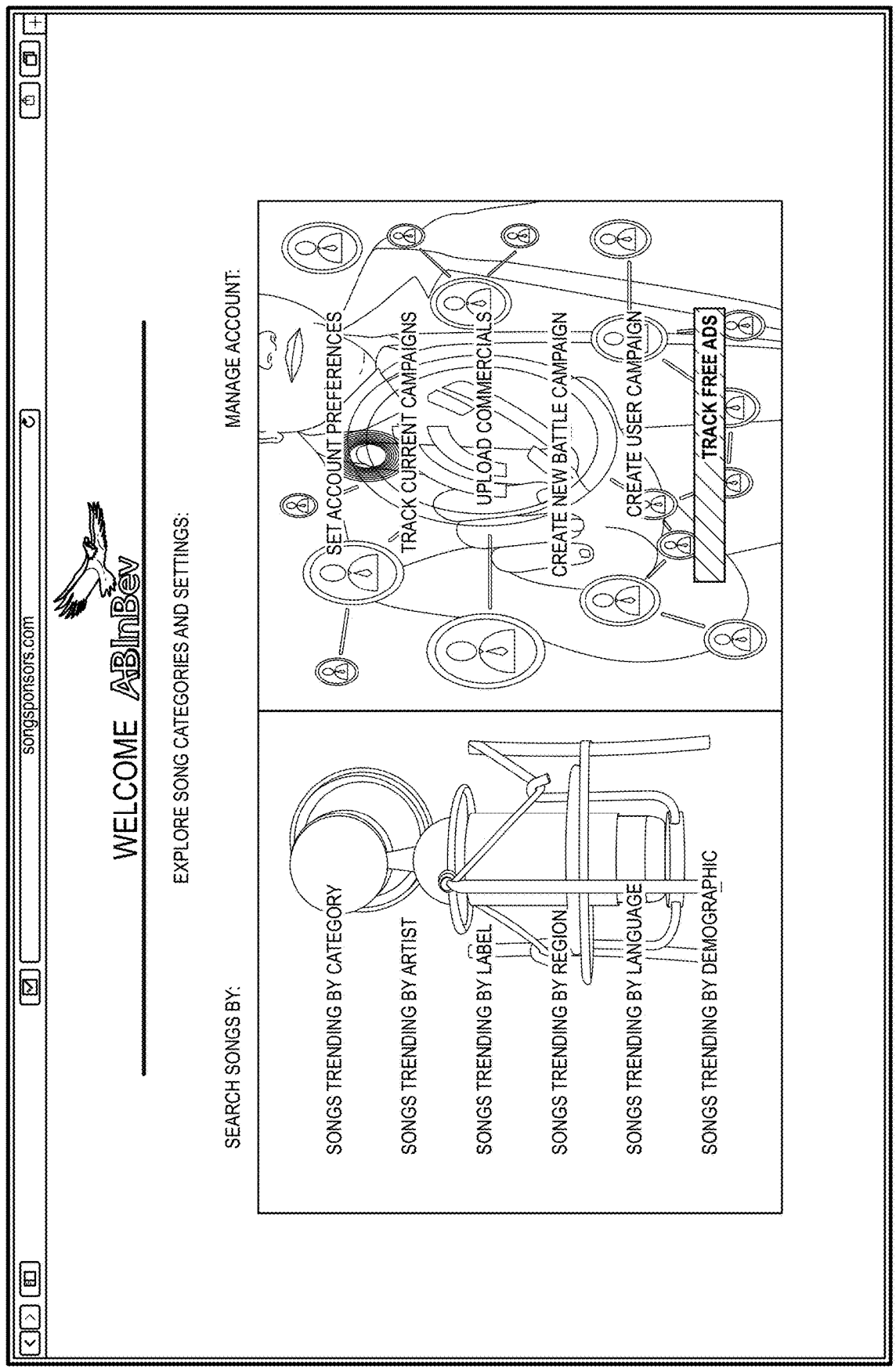
FIG. 39 illustrates an exemplary screenshot of exploring song categories and settings based on the current disclosure.
Figure 40:
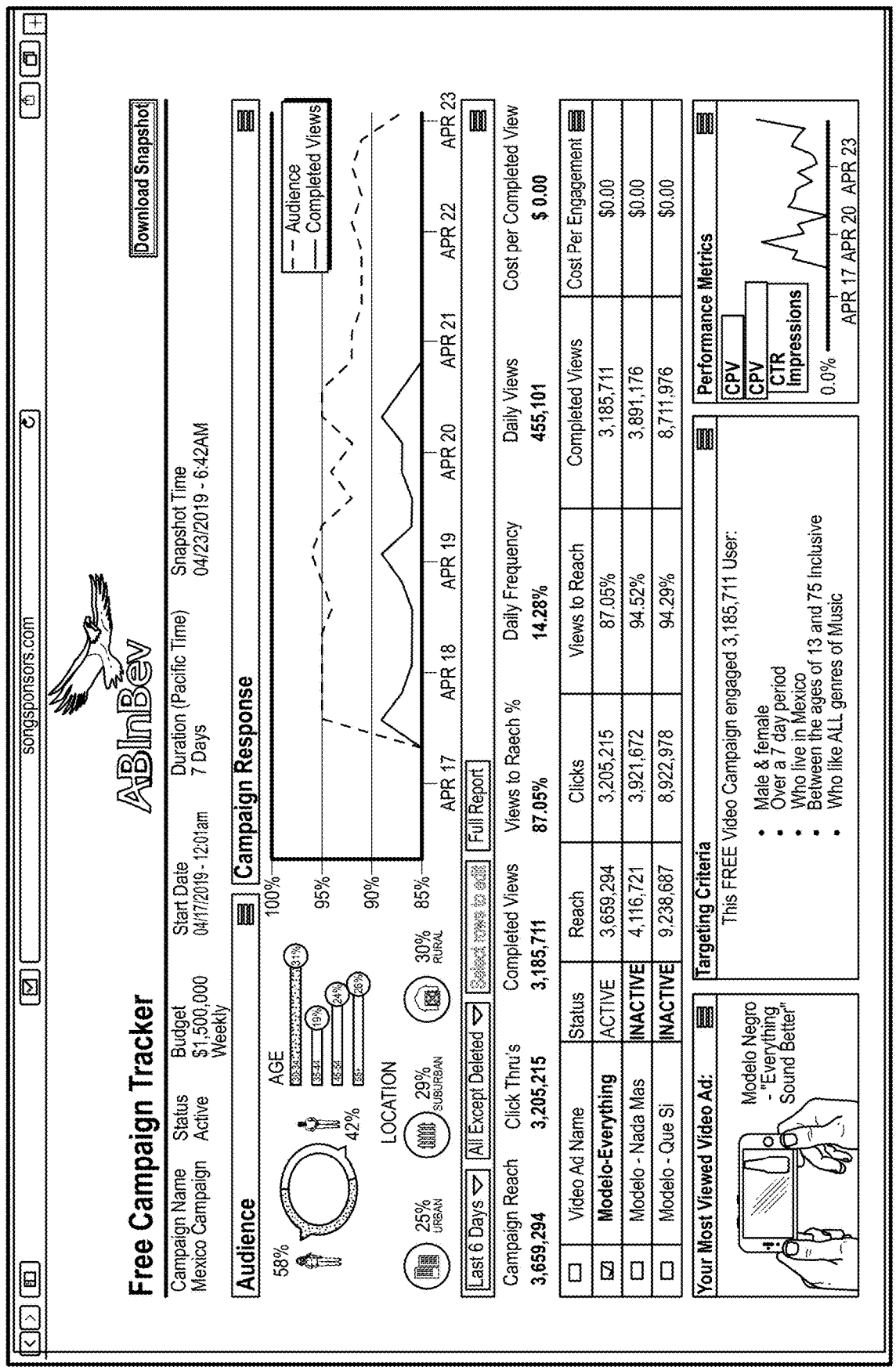
FIG. 40 illustrates an exemplary screenshot of a campaign tracker based on the current disclosure.
Figure 41:
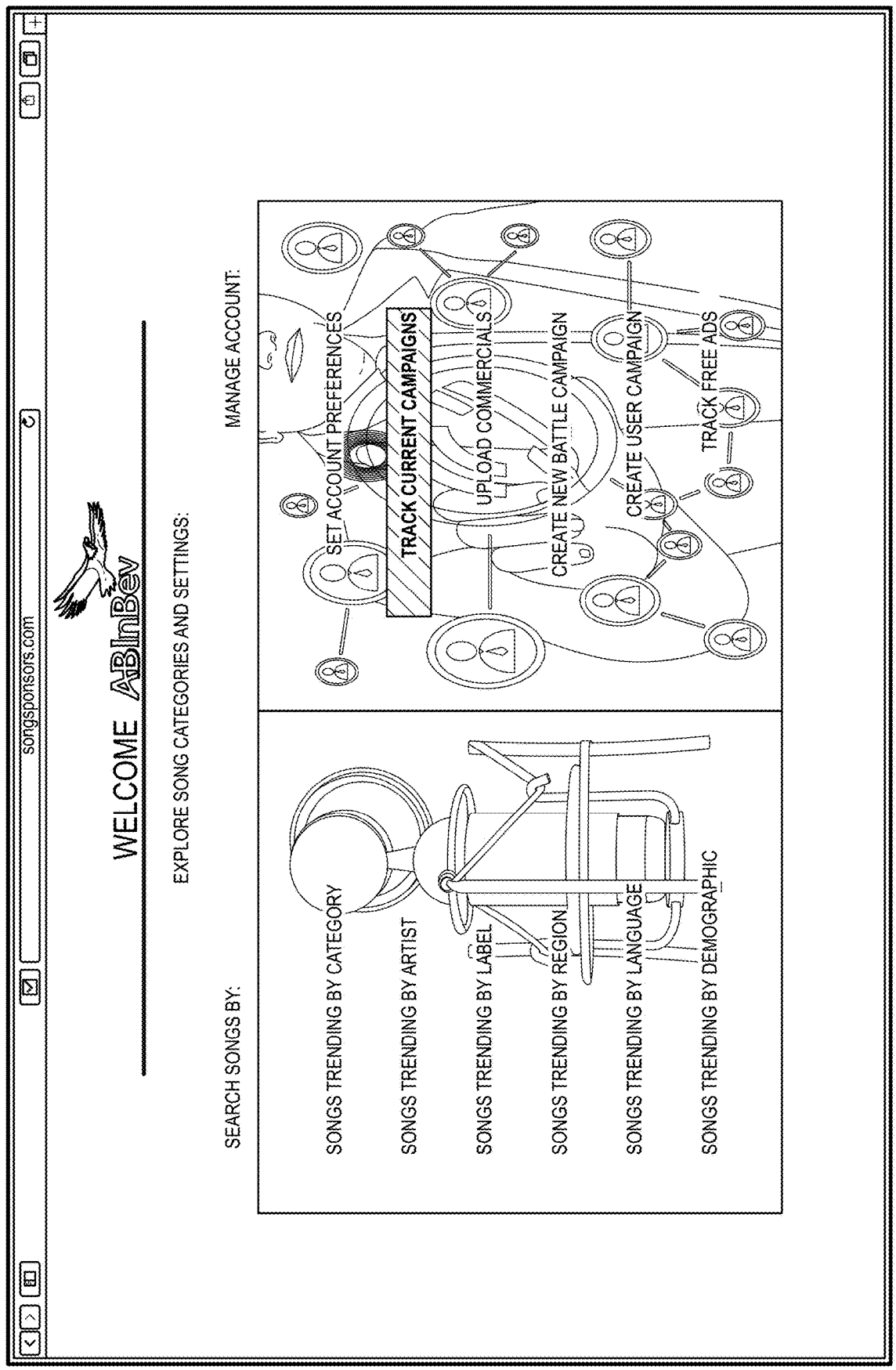
FIG. 41 illustrates an exemplary screenshot of exploring song categories and settings based on the current disclosure.

FIG. 23 shows one exemplary manner in which computer-executable instructions for performing any of the disclosed embodiments can be transmitted, accessed, or received using a remote server computer (such as the server computer 120 shown in FIG. 5) or a remote computing environment (such as the computing environment 130 shown in FIG. 6). At process block 140, for example, the client computer sends a request to download computer-executable instructions for performing any of the disclosed methods or techniques (e.g., after registering or logging in to the system). In process block 142, the request is received by the remote server or by respective components of the remote computing environment. In process block 144, the remote server or computing environment transmits computer-executable instructions for performing any of the disclosed methods or techniques. At 146, the computer-executable instructions are received (e.g., stored, buffered, and/or executed) by the client computer.

ADDITIONAL EXAMPLES

FIGS. 24-42 illustrate an exemplary viral pricing system and method of use thereof.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope and spirit of these claims.

I claim:

1. A method of combining two or more songs to present one or more campaigns to a plurality of audience members, the method comprising:
   providing a database including a plurality of available musical selections;
   receiving from a user a first selection, over a computer network, of a first musical selection from the database;
   receiving from the user a second selection, over the computer network, of a second musical selection from the database;
   receiving one or more videos, over the computer network, from the user;
   combining the first selection, second selection, and the one or more videos into a campaign video;
   providing the campaign video for playback to the plurality of audience members;
   receiving a vote from the plurality of audience members, the vote reflecting a preference for the first selection or the second selection; and
   providing a plurality of campaign videos for playback to the plurality of audience members,
   wherein the plurality of campaign videos are provided for playback in a tournament manner, and votes are received from the plurality of audience members to determine a winner of the tournament of campaign videos,
   wherein the tournament manner includes a plurality head-to-head matchups and each of the plurality of audience members may vote only once within ach of the plurality of head-to-head matchups.

2. The method of claim 1, wherein the playback of the campaign video provides the or more videos between the first selection and the second selection.

3. The method of claim 1, further comprising calculating a cost per a user experience based on a campaign budget and a number of audience members that view the campaign video and/or provide a vote, wherein the cost per the user experience is reduced when the number of viewing/voting audience members is increased.

4. The method of claim 1, further comprising:
   receiving selected target demographic information from the user and adjusting the providing of the campaign video toward the selected target demographic information.

5. The method of claim 4, wherein the demographic information comprises gender information.

6. The method of claim 4, wherein the demographic information comprises age information.

7. The method of claim 4, wherein the demographic information comprises economic information.

8. The method of claim 1, further comprising:
   receiving selected target geographic information from the user and adjusting tie providing of the campaign video toward the selected target geographic information.

9. The method of claim 8, wherein the target geographic information comprises a geographic region, country, and/or state.

10. The method of claim 1, wherein the tournament comprises a bracket of
    four musical selections.

11. The method of claim 1, wherein the tournament comprises a bracket of
    eight musical selections.

12. The method of claim 1, wherein the tournament comprises a bracket of sixteen musical selections.

13. The method of claim 1, wherein the tournament comprises a bracket of thirty-two musical selections.

14. The method of claim 1, wherein the tournament comprises a bracket of sixty-four musical selections.

15. The method of claim 1, wherein the tournament comprises at least four musical selections.

16. The method of claim 1, wherein one of the plurality of available musical selections is selected from votes of the audience members as a winner of the tournament.

17. The method of claim 1, further comprising:
    calculating and displaying to the user real-time analytics of the one or more campaigns.

18. The method of claim 17, further comprising:
    receiving a modification to the one or more campaigns from the user, wherein the modification is based on real time analytics that reflect an increase or decrease in view activity and includes increasing or decreasing a budget.

* * * * *

UNITED STATES PATENT AND TRADEMARK OFFICE
CERTIFICATE OF CORRECTION

| | |
|---|---|
| PATENT NO. | : 12,014,711 B2 |
| APPLICATION NO. | : 17/202140 |
| DATED | : June 18, 2024 |
| INVENTOR(S) | : Daniel Patrick Murphy |

It is certified that error appears in the above-identified patent and that said Letters Patent is hereby corrected as shown below:

In the Claims

Column 13, Lines 40-43, Claim 1 "wherein the tournament manner includes a plurality head-to-head matchups and each of the plurality of audience members may vote only once within ach of the plurality of head-to-head matchups" should read -- wherein the tournament manner includes a plurality head-to-head matchups and each of the plurality of audience members may vote only once within each of the plurality of head-to-head matchups --

Column 14, Lines 16-18, Claim 8 "The method of claim 1, further comprising: receiving selected target geographic information from the user and adjusting tie providing of the campaign video" should read -- The method of claim 1, further comprising: receiving selected target geographic information from the user and adjusting the providing of the campaign video --

Signed and Sealed this
First Day of October, 2024

Katherine Kelly Vidal
*Director of the United States Patent and Trademark Office*